(12) United States Patent
Kraus et al.

(10) Patent No.: US 8,331,544 B2
(45) Date of Patent: Dec. 11, 2012

(54) METHOD AND SYSTEM FOR REMOTELY CONTROLLING ACCESS TO AN ACCESS POINT

(75) Inventors: Kevin C. Kraus, Indianapolis, IN (US); Greg Baldauf, Carmel, IN (US); Mark A. Caterino, Prospect, CT (US)

(73) Assignee: Schlage Lock Company, LLC, Indianapolis, IN (US)

( * ) Notice: Subject to any disclaimer, the term of this patent is extended or adjusted under 35 U.S.C. 154(b) by 303 days.

(21) Appl. No.: 12/811,349

(22) PCT Filed: Dec. 31, 2008

(86) PCT No.: PCT/US2008/088599
§ 371 (c)(1),
(2), (4) Date: Jun. 30, 2010

(87) PCT Pub. No.: WO2009/088901
PCT Pub. Date: Jul. 16, 2009

(65) Prior Publication Data
US 2010/0283579 A1 Nov. 11, 2010

Related U.S. Application Data

(60) Provisional application No. 61/019,464, filed on Jan. 7, 2008, provisional application No. 61/009,602, filed on Dec. 31, 2007, provisional application No. 61/056,336, filed on May 27, 2008.

(51) Int. Cl.
*H04M 15/00* (2006.01)

(52) U.S. Cl. .................. 379/127.01; 340/5.7; 340/5.71; 340/5.72; 340/5.73; 709/249

(58) Field of Classification Search .......... 340/5.7–5.73, 340/5.61–5.64, 5.22–5.24; 709/249; 379/127.01
See application file for complete search history.

(56) References Cited

U.S. PATENT DOCUMENTS

2003/0218533 A1* 11/2003 Flick ........................... 340/5.22
2006/0068759 A1 3/2006 Ikebe et al.
(Continued)

FOREIGN PATENT DOCUMENTS
WO 2007058415 A2 5/2007

OTHER PUBLICATIONS

Il-Kyu Hwang et al: "Wireless Access Monitoring and Control System based on Digital Door Lock" IEEE Transactions on Consumer Electronics, IEEE Service Center, New York, NY, US, vol. 53, No. 4, Nov. 1, 2007, pp. 1724-1730, XP011199956, ISSN: 0098-3063; abstract, figures 1-3, p. 1725, col. 1, line 5—p. 1726, col. 2, line 4.

*Primary Examiner* — George Bugg
*Assistant Examiner* — Sharmin Akhter
(74) *Attorney, Agent, or Firm* — Michael Best & Friedrich LLP

(57) ABSTRACT

A method of remotely operating a door lock. The method includes transmitting a first signal from a remote device to a router via a network; transmitting the signal from the router to a mesh network gateway; translating the signal from a network protocol to a mesh network protocol to produce a second signal; transmitting the second signal from the mesh network gateway to the door lock using radio frequency signaling over the mesh network; receiving the second signal at the door lock; and performing an operation at the door lock in response to the second signal being received by the door lock.

21 Claims, 35 Drawing Sheets

U.S. PATENT DOCUMENTS

| | | | |
|---|---|---|---|
| 2006/0181406 A1* | 8/2006 | Petite et al. | 340/521 |
| 2006/0250578 A1 | 11/2006 | Pohl et al. | |
| 2007/0286369 A1* | 12/2007 | Gutt et al. | 379/127.01 |
| 2007/0289012 A1* | 12/2007 | Baird | 726/17 |
| 2007/0290793 A1 | 12/2007 | Tran | |
| 2008/0084299 A1* | 4/2008 | Fisher et al. | 340/542 |

* cited by examiner

PHONE: LOCK SCREEN

PHONE: CAMERA SCREEN

PHONE: LIGHTING & AUTOMATION SCREEN

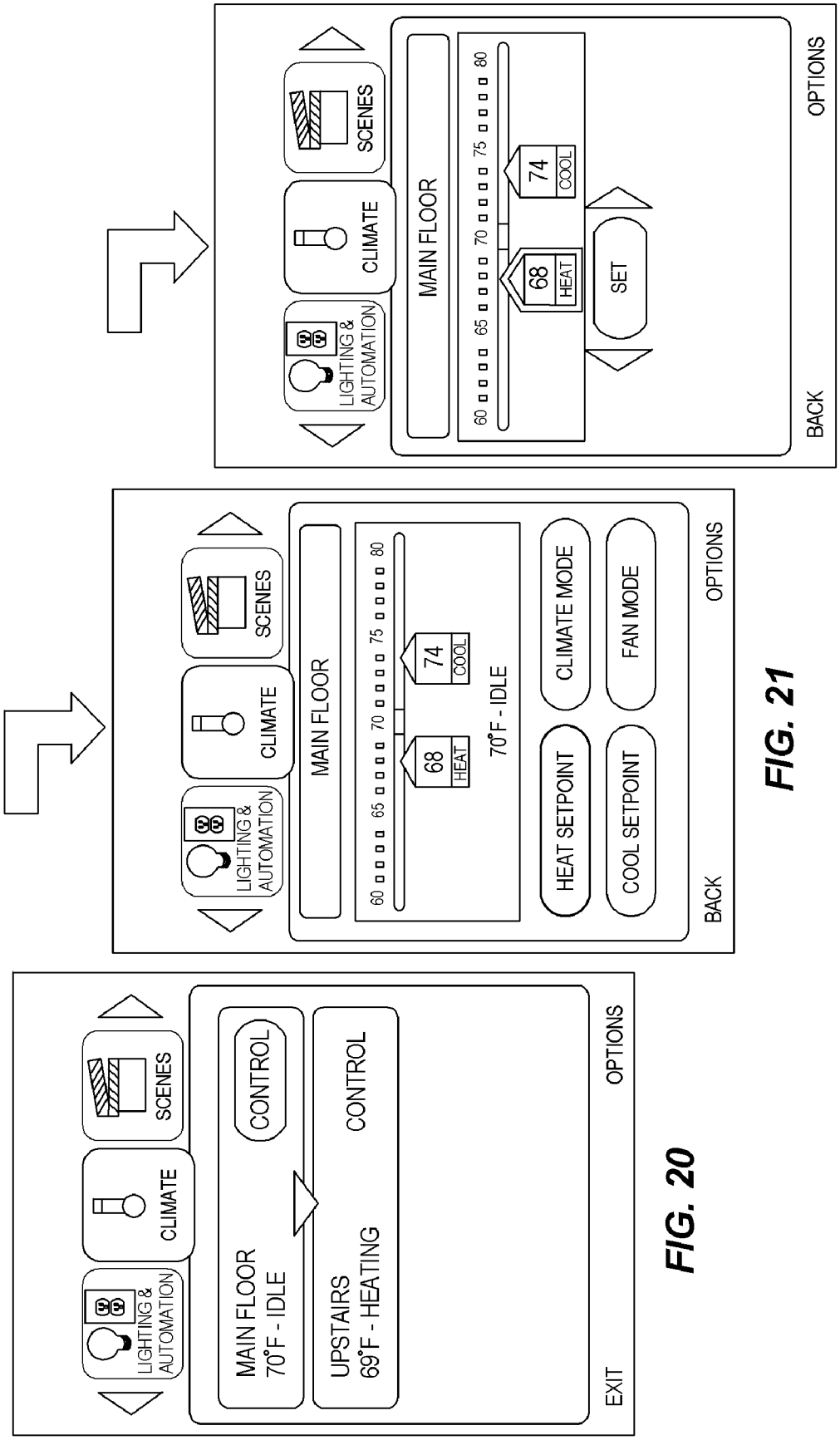

PHONE: SCENES AND SCHEDULES SCREENS

LOGON

EMAIL ADDRESS:

PASSWORD:

FORGET YOUR PASSWORD?

LOGIN

DON'T HAVE AN ACCOUNT? CREATE ONE NOW.

*FIG. 25*

METHOD AND SYSTEM FOR REMOTELY CONTROLLING ACCESS TO AN ACCESS POINT

CROSS-REFERENCE TO RELATED APPLICATIONS

This application claims the benefit of U.S. provisional application No. 61/009,602, filed Dec. 31, 2007; U.S. provisional application No. 61/019,464, filed Jan. 7, 2008; and U.S. provisional application No. 61/056,336, filed May 27, 2008, each of which is incorporated herein by reference in its entirety.

BACKGROUND

The invention relates to radio frequency mesh networks for controlling security and other devices in homes, to a door lock that can be monitored and controlled remotely through a mobile device or via a computer network using a radio frequency mesh network, and to a gateway device that couples a radio frequency mesh network to a computer network.

Many consumers would like to monitor conditions in their homes and be able to control devices within their homes remotely, for example while they are on vacation or at work. If used in a consumer's home, the system would be relatively simple and inexpensive and would be easily installed into existing structures. Ideally, the system would be able to be accessed remotely through existing communications devices, such as the Internet and/or mobile electronic devices such as cell phones.

SUMMARY OF THE INVENTION

In one aspect, the invention is a method of remotely operating a door lock. The method includes transmitting a first signal from a remote device to a router via a network; transmitting the signal from the router to a mesh network gateway; translating the signal from a network protocol to a mesh network protocol to produce a second signal; transmitting the second signal from the mesh network gateway to the door lock using radio frequency signaling over the mesh network; receiving the second signal at the door lock; and performing an operation at the door lock in response to the second signal being received by the door lock.

In another aspect, the invention is a system for remotely controlling access to an access point. The system includes a lock having a locking mechanism, a radio-frequency mesh network transceiver operatively coupled to the lock, a power source, and at least one of a keyed entry system and a keyless entry system operatively coupled to the locking mechanism. The lock is positioned adjacent the access point and the locking mechanism is movable between a locked position and an unlocked position. The system also includes a radio-frequency mesh network gateway device having a housing, a radio-frequency transceiver, an Internet Protocol transceiver operatively coupled to the radio-frequency transceiver, a power supply, and a logic and memory unit. The Internet Protocol transceiver is operatively connected to a computer network, wherein the radio-frequency mesh network gateway device is configured to communicate with the lock using radio frequency communications. The system further includes a server operatively connected to the computer network and a remote communication device in operative communication with the server, wherein the remote communication device is configured to remotely monitor and operate the lock.

In another aspect, the invention is a system for remotely controlling access to a plurality of access points. The system includes a plurality of locks, each having a locking mechanism, a radio-frequency mesh network transceiver operatively coupled to each lock, a power source, and at least one of a keyed entry system and a keyless entry system operatively coupled to the locking mechanism. Each lock is positioned adjacent to one of the plurality of access points and the locking mechanism is movable between a locked position and an unlocked position. The system also includes a radio-frequency mesh network gateway device having a housing, a radio-frequency transceiver, an Internet Protocol transceiver operatively coupled to the radio-frequency transceiver, a power supply, and a logic and memory unit. The Internet Protocol transceiver is operatively connected to a computer network, wherein the radio-frequency mesh network gateway device is configured to communicate with each of the plurality of locks using radio frequency communications. The system further includes a server operatively connected to the computer network and a mobile telephone in operative communication with the server, wherein the remote communication device is configured to remotely monitor and operate at least one of said plurality of locks.

BRIEF DESCRIPTION OF THE DRAWINGS

Other objects and advantages of the invention will become apparent upon reading the following detailed description and upon reference to the accompanying drawings in which:

FIG. 20 illustrates an enlarged view of a second Climate window displayable on a mobile device;

FIG. 21 illustrates an enlarged view of a third Climate window displayable on a mobile device;

FIG. 22 is an enlarged view of the window of FIG. 19;

FIG. 25 illustrates a log on window for the web application of FIG. 7;

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items.

The invention is directed to a system and hardware for enabling remote monitoring and control of devices that are connected to a radio-frequency mesh network, for example in a home.

Figure 1:
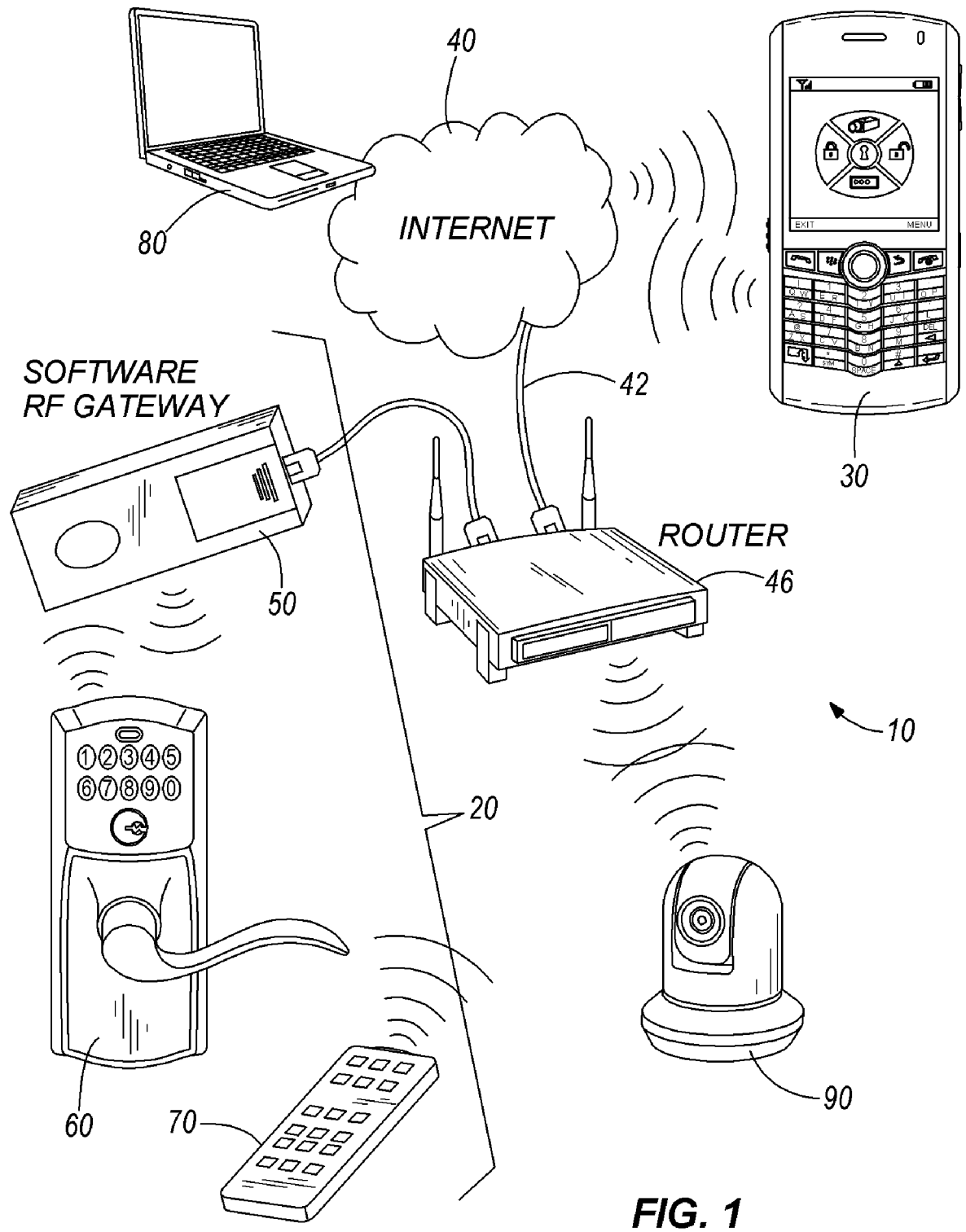
FIG. 1 is a diagram of a system for coupling a computer network, such as the Internet, to a radio-frequency (RF) mesh network using a gateway device to allow remote monitoring and control of the RF mesh networked devices from a mobile device or a networked computer.

FIG. 1 illustrates a system 10 that monitors and controls household devices including but not limited to door locks, deadbolts, cameras, lights, temperature controls, appliances, and the like. The system 10 includes a radio frequency (RF) mesh network 20 that can be coupled to a mobile device 30 via a computer network 40, e.g. the Internet (FIG. 1). An RF mesh network gateway device 50 couples the RF mesh network 20 to the computer network 40. FIG. 1 illustrates a door lock 60, e.g. for use on an entrance door of a home or other structure, that is configured to send and receive RF signals as part of the RF mesh network 20. However, it should be understood that many other household devices can send and receive RF signals as part of the RF mesh network 20 and the illustrated door lock 60 is simply an example of one of these devices.

In the mesh network 20 (FIG. 1), each connected device acts as a communication node that can send and receive packets of information to any other device in the network. If a particular packet of information is not addressed to the device that receives it, the device transmits the packet to the next device, if necessary, and if configured to do so by the mesh network configuration. Collectively, the devices form a robust wireless network with redundancy and flexibility. In contrast to networks in which only a centralized hub can transmit packets, in the mesh network 20, the networked devices themselves provide multiple alternative pathways from the control unit to more remote devices in the network. Thus, the networked devices in the mesh network 20 can transmit signals around obstacles that would block direct transmission from a centralized hub. Devices in the RF mesh network 20 as disclosed herein generally communicate with one another wirelessly, using radio frequency communications. However, other communication means (e.g., wired, infrared, etc.) could be employed in place of or in conjunction with radio frequency communications. It should also be noted that the use of a mesh network can increase battery life as the various components transmit RF signals at a lower power level when compared to standard wireless networks. The additional RF devices in the network can retransmit the signals such that each device only needs to transmit a signal a short distance, and thus a lower power transceiver is adequate.

In one construction, the RF mesh network devices communicate according to the Z-WAVE protocol. As part of its implementation of the mesh network 20, the Z-WAVE protocol includes procedures for routing of commands between networked devices to the correct final destination. Z-WAVE uses a two-way RF system that operates in the 908 MHz band in the United States. Z-WAVE is a bi-directional communication protocol. A message from node A to node C can be successfully delivered even if the two nodes are not within range providing that a third node (node B) can communicate with nodes A and C. If the preferred route is unavailable, the message originator will attempt other routes until a path is found to node C. Therefore, a Z-WAVE network can span much further than the radio range of a single unit. The more nodes in a network, the more robust it becomes. Z-WAVE is also low power when compared to other networks, thereby making it suitable for battery powered devices. Z-WAVE messages can also be encrypted using robust data encryption methods if desired. Additional description of the Z-WAVE protocol and devices compatible with this protocol can be found in U.S. Pat. No. 6,980,080, which is fully incorporated herein by reference. Other protocols for implementing an RF mesh network can be used as well, if desired.

Figure 2:
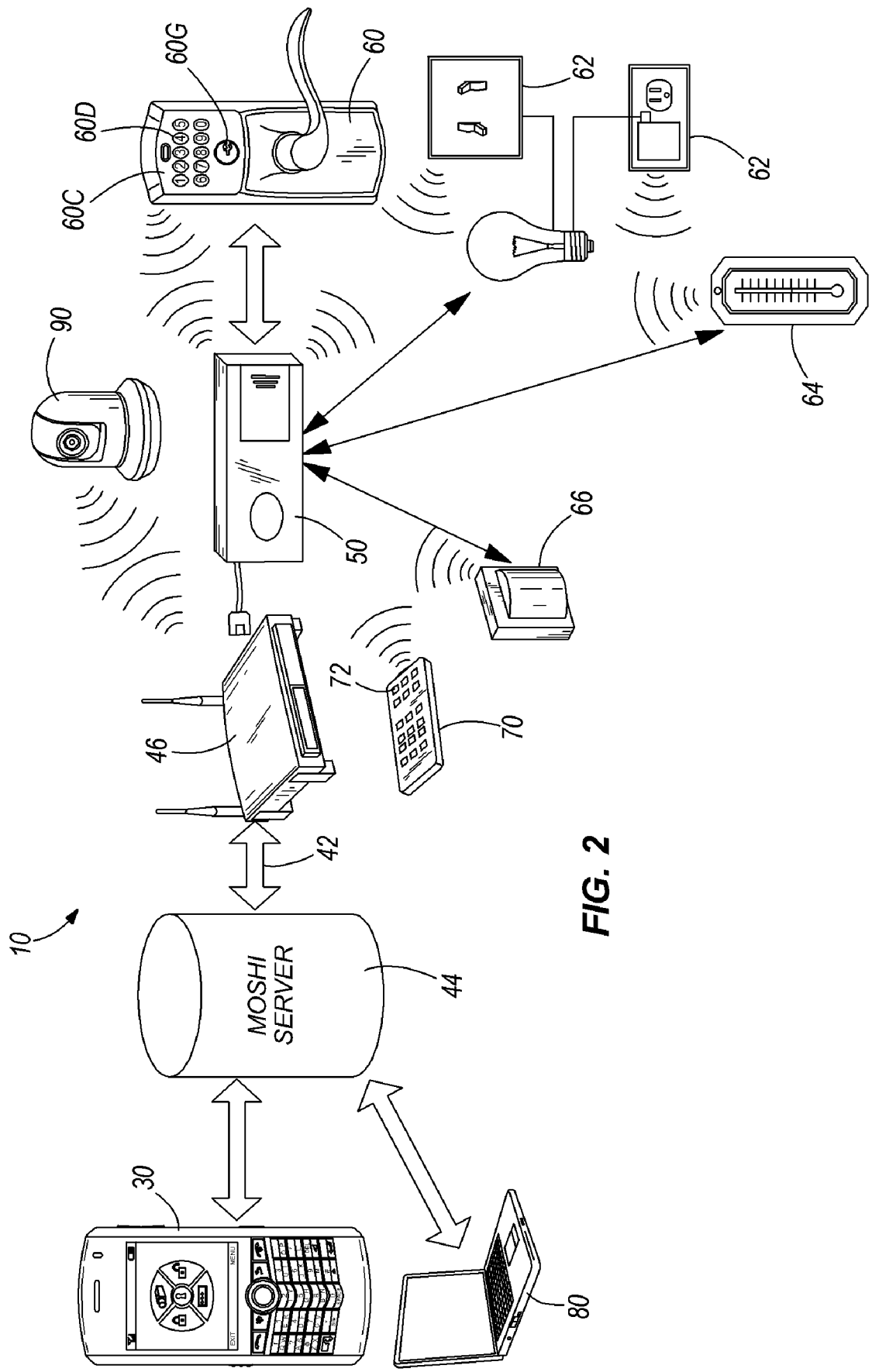
FIG. 2 is a diagram of the system of FIG. 1 with the addition of a networked computer server and additional RF mesh network devices.
Figure 3:
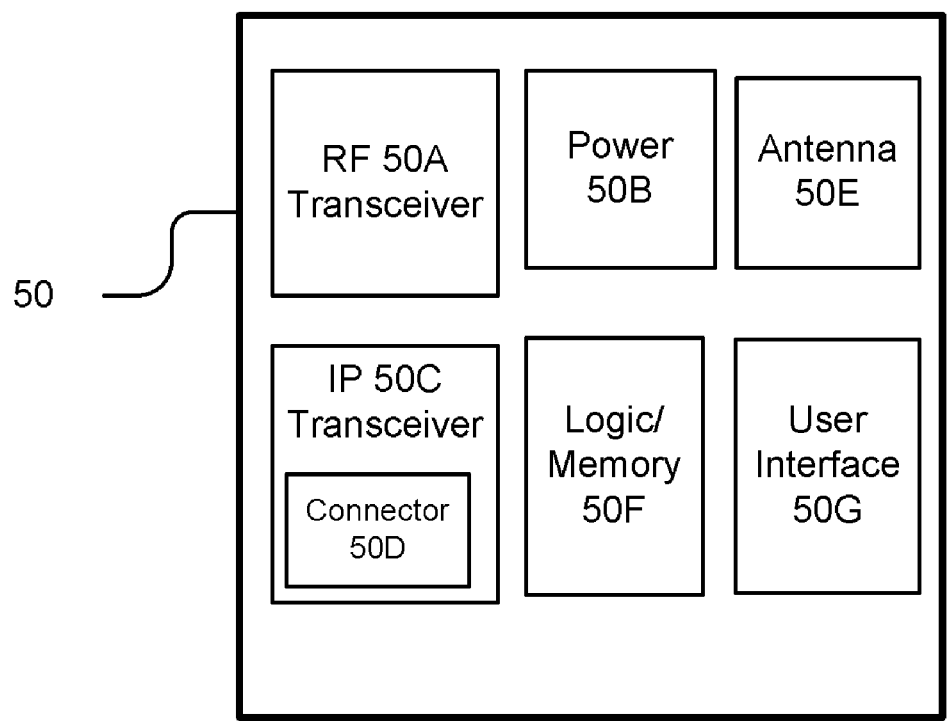
FIG. 3 is a block diagram of the gateway device of FIG. 1 for coupling an RF mesh network to an external computer network such as the Internet.

FIG. 3 is a block diagram of the RF mesh network gateway device 50 of FIGS. 1 and 2. The gateway device 50 includes an RF transceiver 50A for sending and receiving signals to and from the RF mesh network 20, an Internet Protocol (IP) transceiver 50C for communicating with the computer network 40, a power source 50B, a logic and memory unit 50F, and a user interface 50G for inputting information and obtaining status. Other transmission protocols besides Internet Protocol can also be employed to communicate with the computer network 40.

The RF transceiver 50A is suited for communication at the appropriate RF mesh network frequency, for example 908.42 MHz in the US and 868.42 MHz in Europe, although other frequencies can be used as well. The RF transceiver 50A formats the RF signals it transmits according to the communications protocol that is being used, e.g. the Z-WAVE protocol. The RF mesh network gateway device 50 may include an antenna 50E, which can be contained within the housing of the gateway 50 or may be external to the housing.

The IP transceiver 50C formats the signals it sends according to the communications protocol, e.g. Internet Protocol, used to connect the computer network 40 (e.g. the Internet). The IP transceiver 50C includes a connector 50D for connecting to the computer network 40. In one construction, the RF mesh network gateway device 50 connects to a local-area network (LAN) via an Ethernet connection, although other types of connections are possible. As shown in FIG. 1, the connector 50D includes a cable having a plug to connect to an Ethernet port on a router 46. As illustrated in FIG. 1, the router 46 can include wireless Internet Protocol signaling to communicate with suitable wireless-compatible devices such as a camera 90. The connector 50D may alternatively connect to a wireless router 46 using a wireless connection, for example using an IEEE 802.11x-based wireless networking protocol.

The logic and memory unit of the gateway device could be used for the purpose of storing and executing macros or scenes. These macros or scenes include a series or sequences of RF network commands intended to be transmitted for the purposes of controlling other RF networked devices such as lights, other locks, thermostats, etc. Execution of these macros or scenes can be setup to take place based the reception of a signal from the RF network or computer network.

The power source 50B (FIG. 3) can be a battery or other portable power supply, or an alternating current (A/C) or other fixed power source. In a preferred construction, power can be provided by both the A/C source as well as a battery. When the power source 50B is a battery, the battery can be disposable or rechargeable. In one construction, the RF mesh network gateway device 50 operates primarily from A/C power but can also be operated with battery power alone for periods of time, thereby allowing the RF mesh network gateway device 50 to be detached from the A/C power source and brought into proximity with the various devices 60 to conduct the registration, or 'learning in', process as described below. Thus, the RF mesh network gateway device 50 can be used both as the gateway between the RF mesh network 20 and an outside computer network 40 as well as for 'learning in' new components to the RF mesh network 20.

The user interface 50G includes input mechanisms such as one or more buttons and an output mechanism such as a screen or indicator lights. The user interface 50G can be used to effectuate the various functions of the gateway 50, including the 'learning in' process as well as any control or reporting functions of the gateway 50.

The logic and memory unit 50F is configured to coordinate the various functions of the RF mesh network gateway device 50 as discussed. The logic and memory unit 50F coordinates transfer of signals between the RF mesh network 20 and the computer network 40. The logic and memory unit 50F translates signals from the IP transceiver 50C into commands that the RF transceiver 50A broadcasts to the RF mesh network 20. The logic and memory unit 50F also translates signals from the RF transceiver into commands for the IP transceiver to transmit to the computer network 40. The logic and memory unit 50F is connected to the user interface 50G to send and receive input and output and to activate functions of the gateway 50 according to commands sent through the input.

Figure 32A:
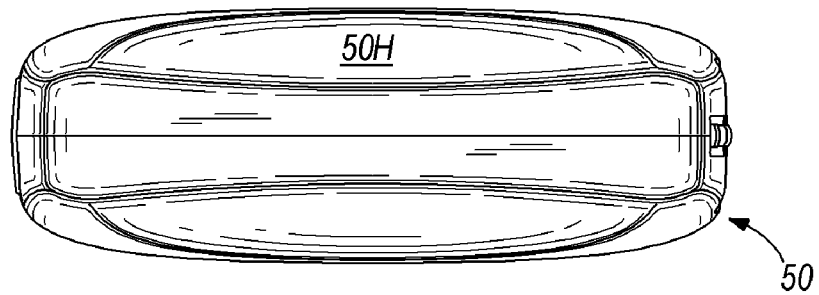
FIG. 32A is a top view of the housing of a gateway device.
Figure 32B:
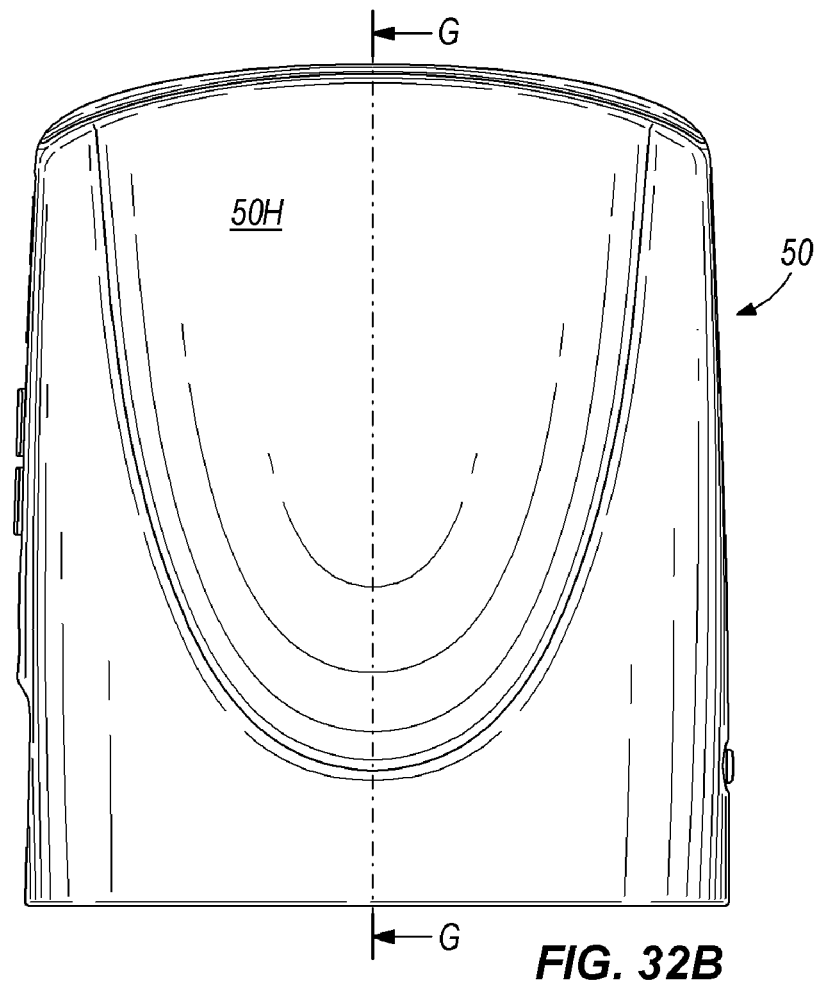
FIG. 32B is a front view of the housing of a gateway device.
Figure 32C:
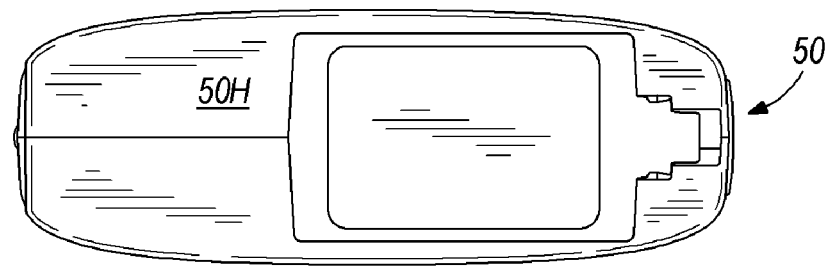
FIG. 32C is a bottom view of the housing of a gateway device.
Figure 32E:
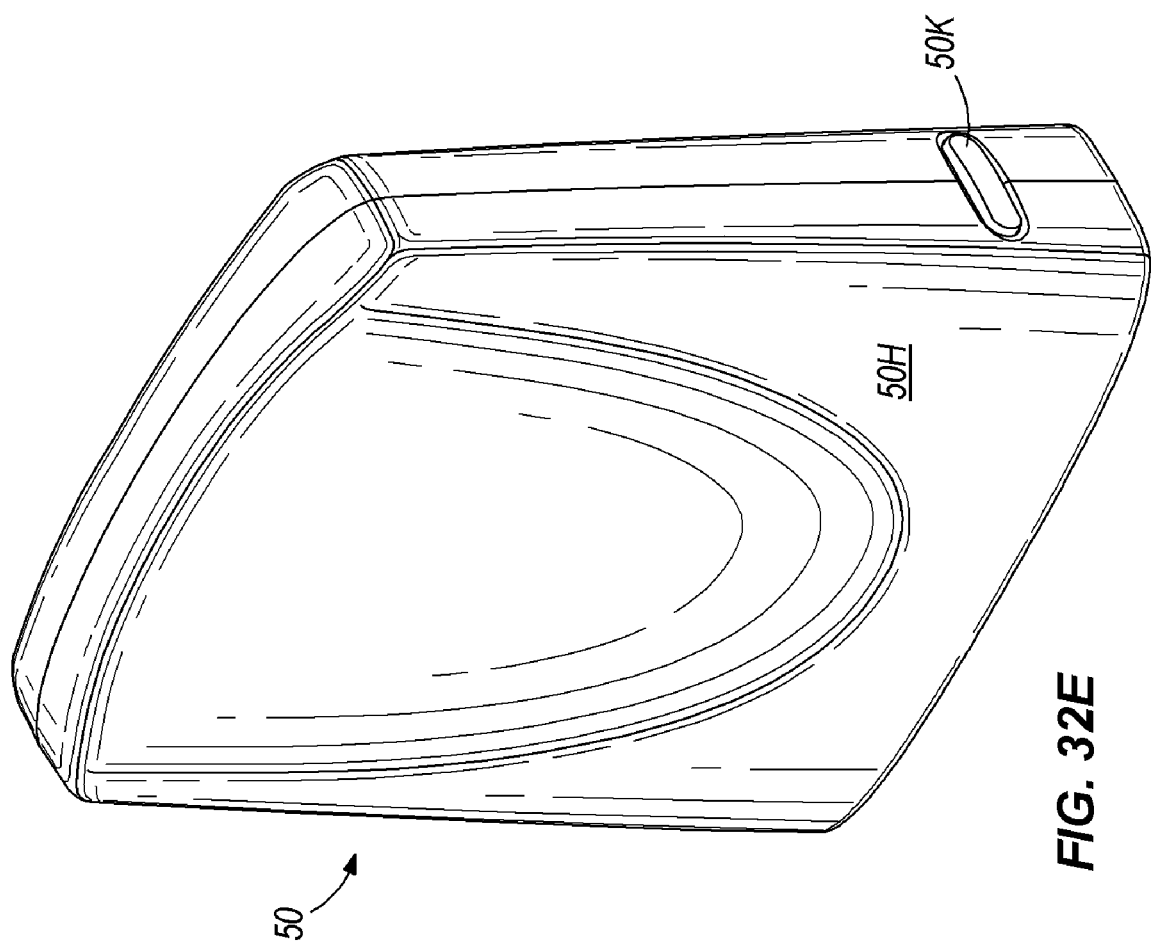
FIG. 32E is a perspective view of the housing of a gateway device.
Figure 32D:
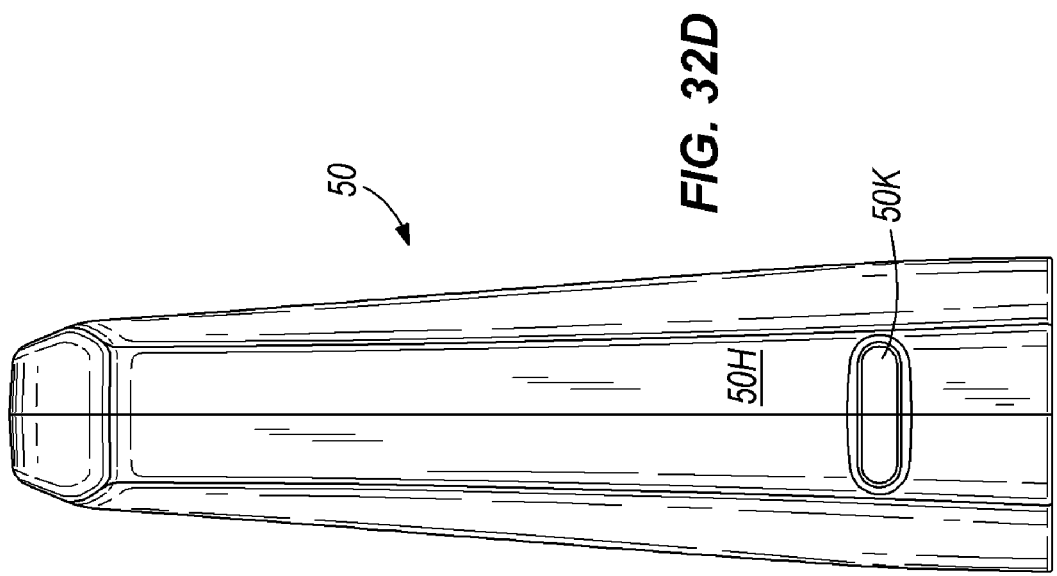
FIG. 32D is a side view of the housing of a gateway device.
Figure 32F:
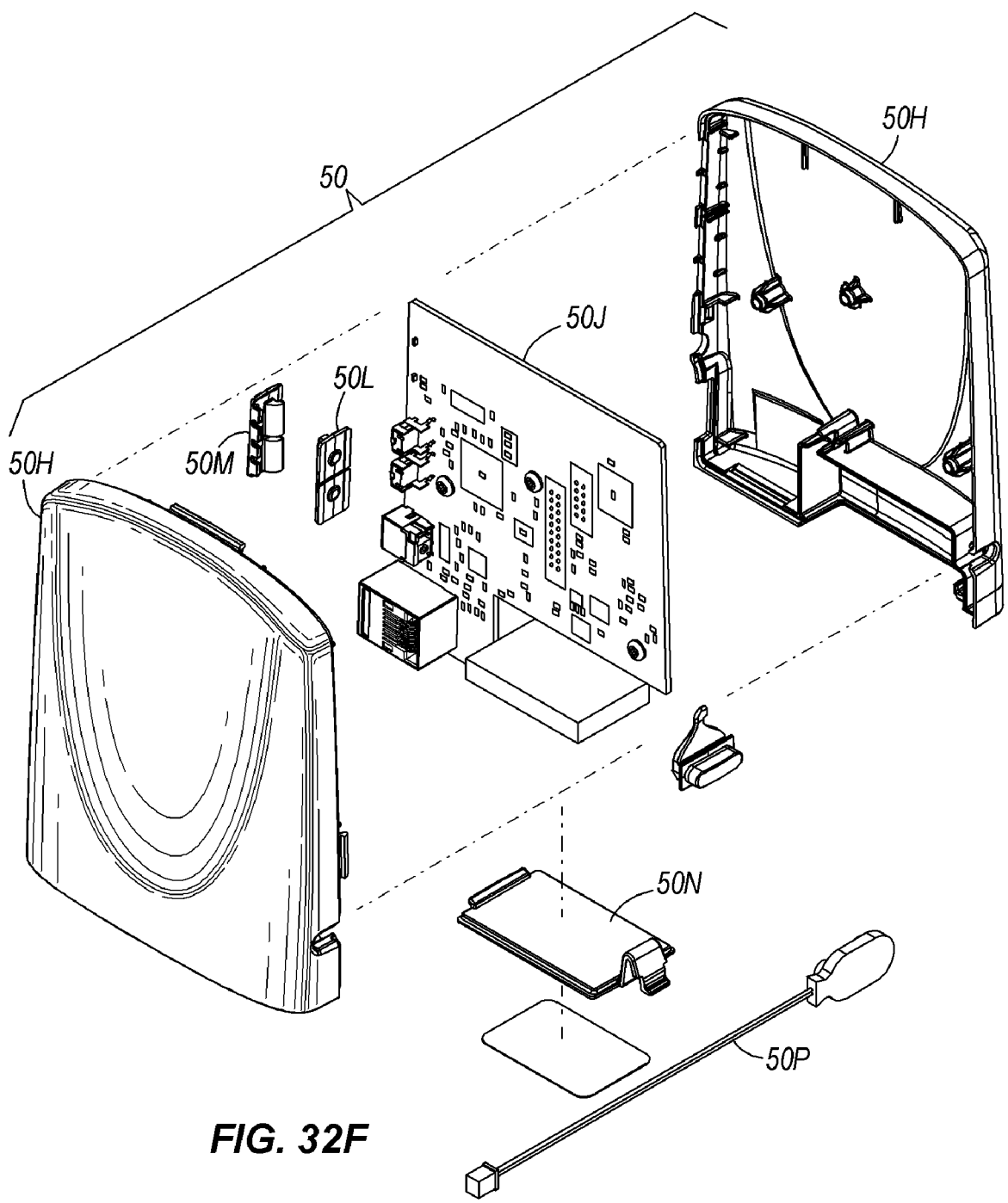
FIG. 32F is an exploded view of a gateway device.
Figure 32G:
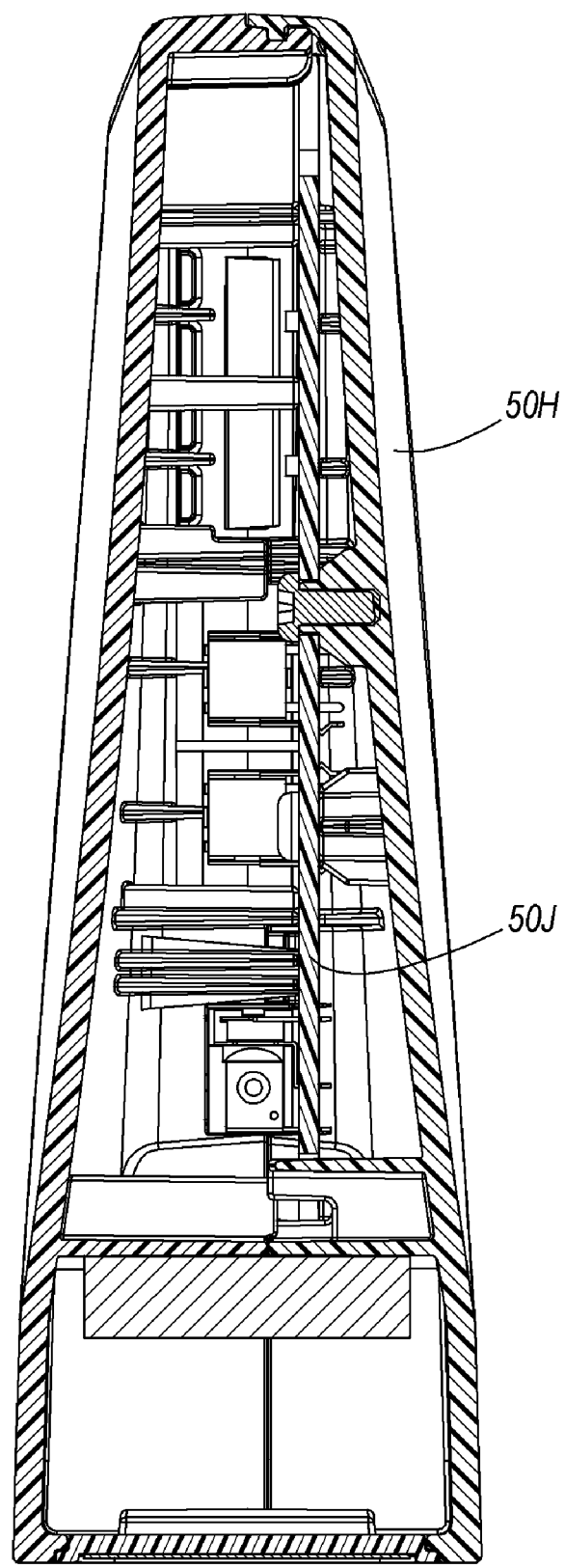
FIG. 32G is a sectional view of a gateway device through the line G-G shown in FIG. 32B.
Figure 33:
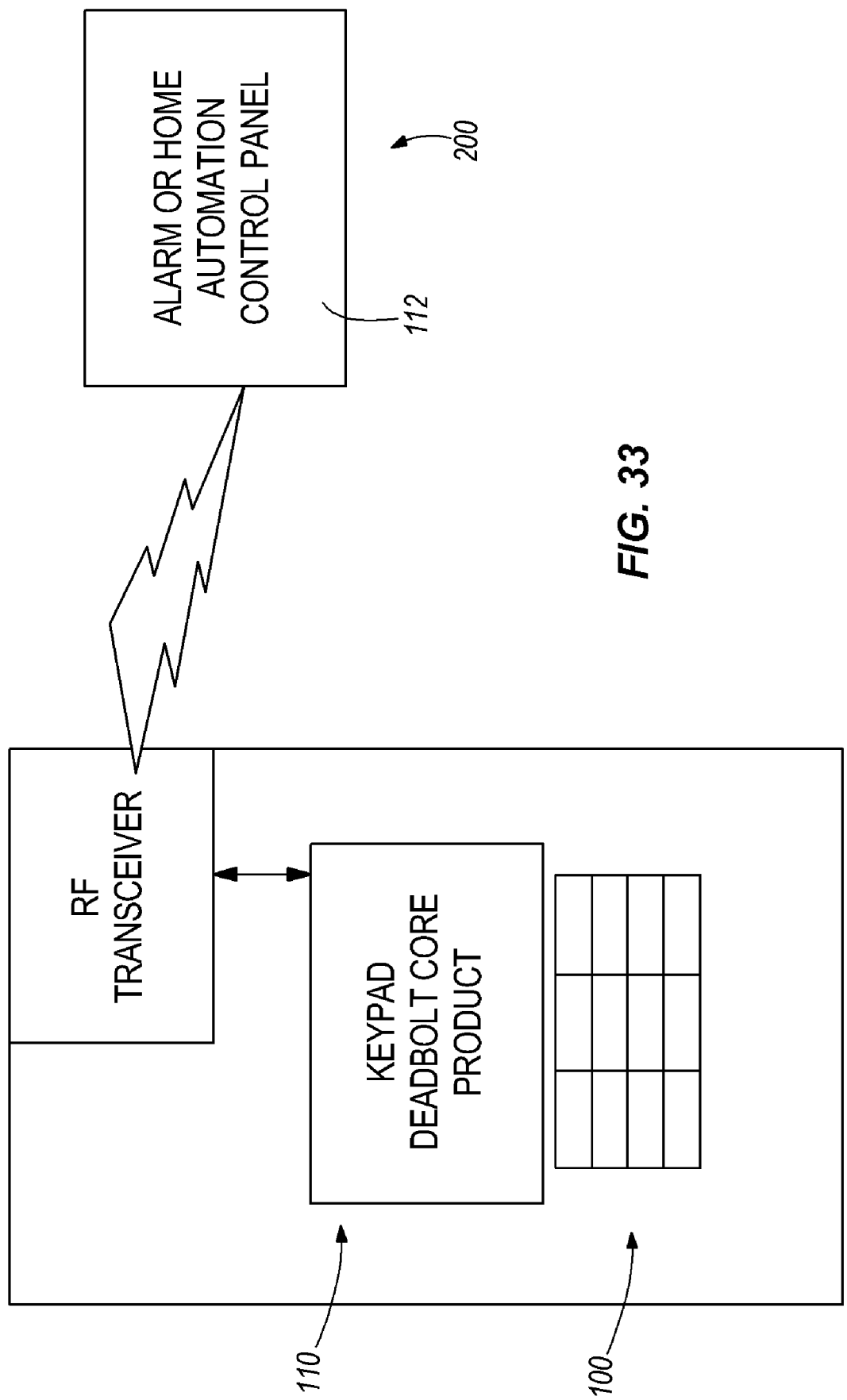
FIG. 33 is a diagrammatic view of an access control assembly of the present invention.

One particular construction of the gateway device 50 is shown in FIGS. 32A-32G. FIGS. 32A, 32B, 32C, 32D, and 32E show top, front, bottom, side, and perspective views, respectively, of a housing 50H of the gateway device 50. FIG. 32F shows an exploded view of the gateway device 50 including the housing 50H, a circuit board 50J, a lighted button 50K, a keypad 50L, indicator lights 50M, a battery cover 50N, and a battery connector 50P. The RF transceiver 50A, IP transceiver 50C and connector 50D, logic and memory unit 50F, and antenna 50E are contained on the circuit board 50J. FIG. 32G shows a cross-section through the gateway device 50 along line G-G in FIG. 32B.

Figure 4:
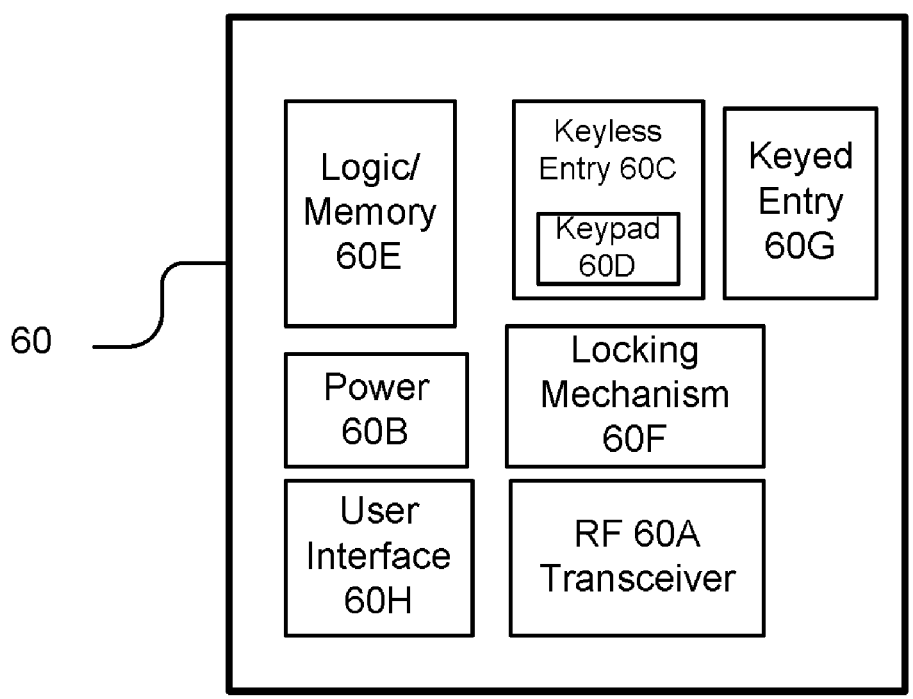
FIG. 4 is a block diagram of a door lock that is configured for use with the RF mesh network of FIG. 1.

The exemplary RF mesh network device depicted in the system 10 shown in FIG. 1 is a door lock 60, which is further shown in a block diagram form in FIG. 4. The door lock 60 of FIG. 4 includes a suitable power source 60B, such as household A/C power or battery power, a keyless entry system 60C, a logic and memory unit 60E, a locking mechanism 60F, a keyed entry mechanism 60G, and a user interface 60H.

The keyless entry system 60C includes a keypad 60D for entering an access code. In other constructions, other data entry systems may be used in place of the keypad (e.g., biometric entry, smart cards, etc.). The keyless entry system 60C communicates with the logic and memory module 60E to store access codes and other information and for carrying out the functions of the door lock 60. The logic and memory module 60E may store individual user codes, where each person having access to the door is issued a unique user code that is stored and compared to input codes at the door to allow access decisions to be made at the door without transmissions.

The keyed entry mechanism 60G can manually operate the locking mechanism 60F, for example in case of power loss or other malfunction. The locking mechanism 60F of the door lock 60 may include a locking device such as a sliding deadbolt, or other suitable locking mechanism coupled to a door handle or knob and/or to a key mechanism. In the illustrated construction, the locking mechanism 60F is power-driven, for example by a solenoid or an electric motor, to facilitate remote operation. The door lock 60 may also include a user interface 614 having visual (e.g. an LED light and/or an LCD screen) and/or audio (e.g. a speaker or other sound-generating device) components.

Where the door lock 60 is part of a networked system 10 such as that described herein, functions that can be performed include, but are not limited to confirming the status of a lock, e.g. whether the door lock 60 is locked or unlocked, notifying the network of an attempted access, including whether the lock 60 was accessed, when it was accessed and by whom, and whether there were attempts at unauthorized access. In some constructions, the door lock 60 can also send a signal to unlock the lock 60, add or delete user codes for locks having such codes, and, if the door lock 60 is paired with a suitable camera 90, transmit images of the person seeking entry into the home. The door lock 60 can also be used to send a command to disarm an electronic alarm or security system, or to initiate a duress command from the keypad of the door lock 60, where the duress command may be utilized by the network to transmit a message to a mobile device 30, an electronic alarm or security system, a networked computer 80, or a networked computer server 44 (see below). In addition, the keypad 60D or other input device of the door lock 60 may be used to initiate macros to control devices connected to the RF mesh network 20, including without limitation interior or exterior lights, thermostats, a garage door opener, water flow regulators, other locks, and an electronic alarm system.

The lock 60 is a self contained functional lock such as an electronic lock used to secure an access point. In addition, the lock 60 contains an electronically-controlled system containing a keypad 60D, a logic-memory unit 60E, and an electro-mechanical mechanism 60F. Using the keypad 60D, a user can enter a numeric pin code to activate the electro-mechanical mechanism 60F thus unlocking the lock 60. The keypad 60D is also used to program and configure the operation of the lock 60 (i.e., add pin codes, delete pin codes, enable audible beeper operation, and set relocking time delays). Additionally, the lock 60 contains an RF transceiver 60A, or interface, consisting of another logic-memory unit, an antenna for the reception and transmission of RF signals, and all necessary electronic components required for the reception and generation of RF signals. This RF interface provides the same operation, programming, and configuration functionality as that afforded by the keypad 60D, in addition to a wide range of features including but not limited to lock status reporting, lock operation reporting, lock battery status, and the like.

A particular construction of an embodiment of the system 10, including a lock and a security system, is shown in FIGS. 33-43 and is explained in the accompanying text.

FIG. 2 illustrates additional details of the system 10 of FIG. 1. FIG. 2 illustrates a networked computer server 44, which communicates with remote devices including a networked computer 80 and a mobile device 30. While other servers could be employed, in the construction illustrated in FIG. 2 the networked computer server 44 is a MOSHI server such as those provided or hosted by Crayon Interface (Holland, Mich.) which communicates with cell phones or other mobile devices that support simple data transfer (e.g. short-message service (SMS)). Communications using the MOSHI server do not require the cell phone or other mobile device 30 to have direct access to the World Wide Web ("web"). The MOSHI server communicates with a mobile device 30 or with a networked computer 80 and in turn sends and receives information to or from the RF mesh network 20 via the RF mesh network gateway device 50. In addition, the MOSHI server can communicate using multimedia messaging including video, for those mobile devices 30 that support such data types. A typical MOSHI mobile platform is a worldwide messaging network and software platform designed to connect people to information and products important to them. The MOSHI server includes a software application that allows for the control of the lock device and any other devices enrolled within the home's RF network. The software application can also maintain a database of the user's RF networked devices and mobile devices and any interoperable functionality of these devices as set up by the user.

In alternative constructions, the networked computer server 44 is a web server that communicates with a mobile device 30 or networked computer 80 using HyperText Transfer Protocol (HTTP) commands or other protocols suited for use via the Internet, with appropriate web-browsing or other software being loaded on the mobile device 30 or networked computer 80. In still another construction, the RF mesh network gateway device 50 itself acts as a server (e.g. a web server) that can be directly accessed by a networked computer 80 or by a mobile device 30. In one such construction where the RF mesh network gateway device 50 acts as a server, the gateway 50 is directly accessed and controlled remotely by a mobile device 30 or a networked computer 80 without an intervening networked computer server 44 (FIG. 1).

Figure 5:
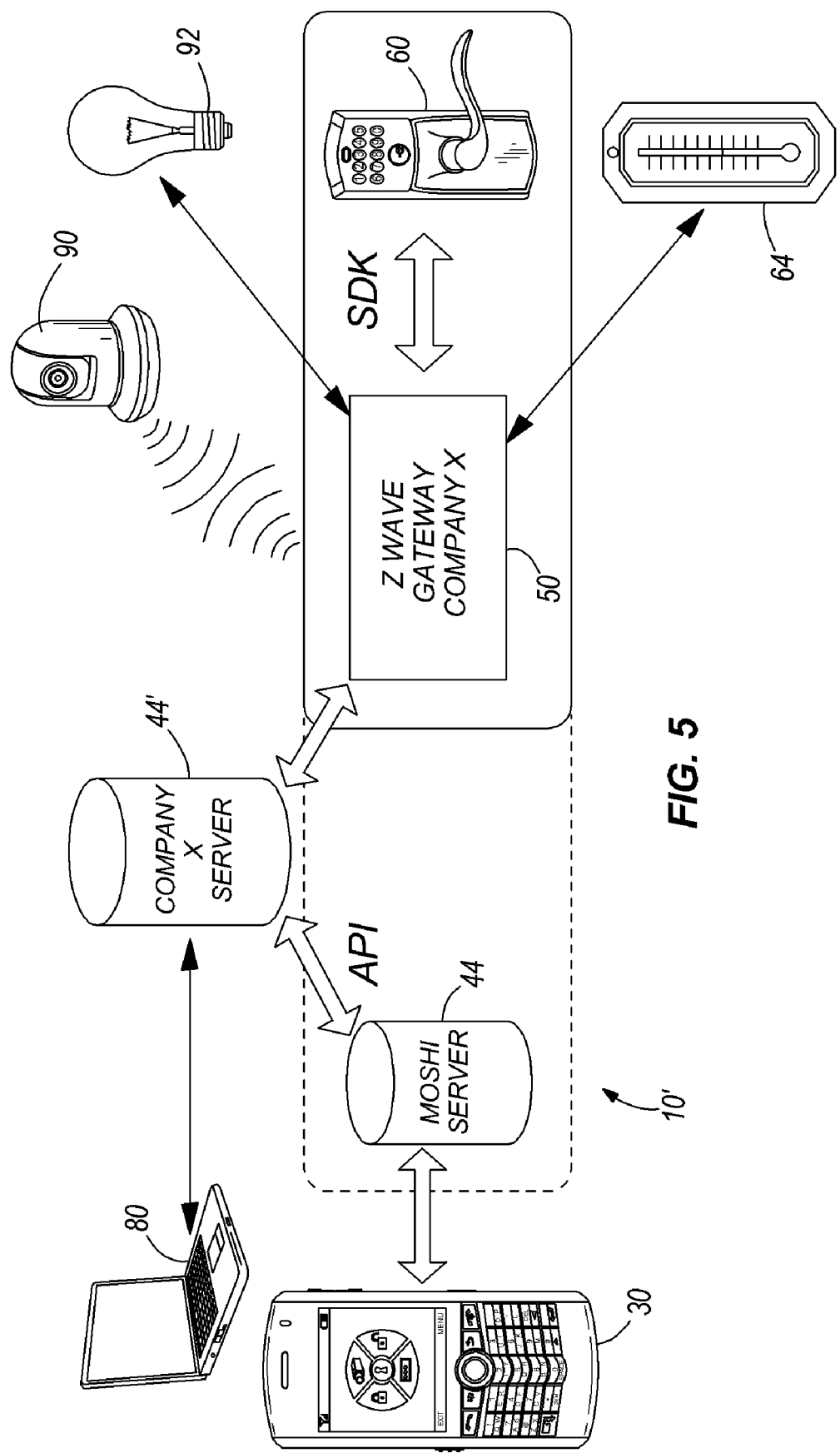
FIG. 5 is a diagram of the system of FIG. 2 with the addition of a second networked computer server in communication with the first networked computer server.

FIG. 5 shows a system 10' similar to that shown in FIG. 2 with the addition of a second networked computer server 44'. The system 10' includes RF mesh network-connected devices 60, 62, 64, an RF mesh network gateway device 50, a camera 90, a first networked computer server 44, a second networked computer server 44', a mobile device 30, and a networked computer 80 (FIG. 5). The first networked computer server 44, which in the construction of FIG. 5 is a MOSHI server, communicates with the mobile device 30, for example using simple data transfer as described above. The first and second networked computer servers 44, 44' communicate with one another using an application program interface (API). The second networked computer server 44' communicates with networked computers 80 and the RF mesh network gateway device 50. The gateway in turn communicates with the RF mesh network-connected devices 60, 62, 64 and the camera 90. Thus, the system of FIG. 5 allows for an additional communication method via a network such as the Internet and communication via a wireless device such as a cell phone 30 and the MOSHI server 44.

The SDK is a kit with the intended purpose of assisting the user to develop their software and/or server applications. The kit will also be offered to developers of home automation applications as well as the manufacturers of home automation devices.

As illustrated in FIG. 1, the RF mesh network 20 includes a controller 70 and one or more RF mesh network-compatible devices such as the door lock 60. Additional RF mesh network devices as illustrated in FIG. 2 include electrical controllers 62 (a wall switch and a plug-in module), a thermostat 64, and a light sensor 66. The devices 60, 62, 64, 66 have the capability to send and receive RF signals between other devices 60, 62, 64, 66 and the controller 70. The controller 70 can be used to directly control each device, for example pressing a button 72 on the controller 70 can actuate an electrical controller 62 or activate a circuit that in turn may light a lamp. Alternatively, the controller 70 may be programmed to automatically operate one or more devices 60, 62, 64, 66, based on a timer or based on the occurrence of a particular event (e.g. when a signal from the light sensor 66 indicates that it is dark outside). The construction illustrated in FIGS. 1 and 2 includes a controller 70 that is separate from the gateway device 50. However, other constructions employ a gateway device 50 that operates as the controller or that operates as the controller in conjunction with a separate, standalone controller 70.

In order for the controller 70 plus one or more devices 60, 62, 64, 66 to form a mesh network 20, the devices 60, 62, 64, 66 are initialized by the controller 70 or the RF mesh network gateway device 50 through a process referred to as 'learning in' of the device. Learning in a device 60, 62, 64, 66 into a mesh network 20 with the controller 70 or gateway device 50 synchronizes the device 60, 62, 64, 66 with the controller 70 or gateway device 50. Prior to being incorporated into a network, an individual RF-controlled device may only transmit low-power radio signals, to avoid having the device inadvertently connect to a nearby but unrelated network. Given that uninitiated devices often transmit only low-power signals, the controller 70 or gateway 50 generally must be brought into sufficiently close proximity to an uninitiated device to be able to initiate wireless communications with the device and thus perform the enrollment (learning in) process. In preferred constructions, power levels are reduced during the "inclusion" or learning in process for the lock and in some constructions other components. In other constructions, normal power learning in or inclusion may be employed. Generally, low power inclusion or learning in has a range of approximately six feet, while normal power transmissions are in the one-hundred foot range. Of course, these ranges can vary widely due to environment and other factors.

Once brought into sufficiently close proximity to initiate wireless communications, the device 60, 62, 64, 66 exchanges information with the controller 70 or gateway 50 regarding the identity of the device 60, 62, 64, 66 and the local RF mesh network 20, for example identifiers and security keys can be exchanged. In various constructions, the user takes steps to initiate the learning in process on one or both of the controller 70 or gateway 50 and the device 60, 62, 64, 66, so that a particular device is not inadvertently learned into the wrong network. In one construction, the device 60, 62, 64, 66 includes a mechanism (e.g. a button) to initiate the learning in process on the device. Similarly, the controller 70 or gateway 50 can include a mechanism (e.g. a button) to initiate the learning in process on the controller 70 or gateway 50. In certain constructions, a security code is first entered on the device 60, 62, 64, 66 to activate mesh network capabilities on the device. The controller 70 or gateway 50 receives an identifying code from the device 60, 62, 64, 66 and adds the device's code to the list of devices that are part of the local RF mesh network 20. In turn, the device 60, 62, 64, 66 receives information about the network 20 so that the device 60, 62, 64, 66 can distinguish signals that it receives from the correct network 20 from signals received from nearby networks (e.g. from a neighboring home) that are not relevant. Once a device 60, 62, 64, 66 has been successfully added to the network 20, or 'learned in', the device's RF communication signals are then transmitted at higher power levels. Once a device 60, 62, 64, 66 has been learned into the network 20, the device 60, 62, 64, 66 then rejects any signals that are received from other RF mesh networks. In some constructions, the controller 70 or gateway 50 indicates to the user that learning in has been successfully completed, for example by flashing an indicator light (e.g. an LED) or broadcasting a sound. It should be noted that not all devices are learned in at low power levels and then transitioned to normal power levels. Some devices are learned in and operate at a normal power level for that device.

To facilitate the learning in process, the RF mesh network gateway device 50 has an optional battery power supply that allows the gateway device 50 to be placed in close proximity to the individual devices 60, 62, 64, 66 that need to be learned into the network 20.

A controller cannot control a device until it is added to the network. Usually this amounts to pressing a key sequence on the device and a button on the controller to pair them, and this enrollment or learning in process only needs to be done once. This process is repeated for each device in the system. The controller learns the signal strength, node ID, and other device information during this process. In the illustrated construction, the gateway acts as the controller in the system and allows for connection to the internet. Other controllers such as wall-mounted or handheld controllers can be "included" in the existing network if desired. The first time a device is added to the network, the controller assigns the device an ID number and tells it the network ID number. If a second controller is added to an existing network, the first controller shares all the network info such as the ID numbers of all existing devices.

Once the RF mesh network 20 has been established, signals can be sent to and received by the devices 60, 62, 64, 66. If a signal received by one of the devices 60, 62, 64, 66 is not intended for that device, the device rebroadcasts the signal so that the signal ultimately reaches its intended target within the local RF mesh network 20. Some signals are intended for multiple devices, such that the signal will be rebroadcast by a device even if that device was one of the intended recipients.

Signals can be generated by the controller 70, the RF mesh network gateway device 50, or by individual devices 60, 62, 64, 66 on the network. An individual device 60, 62, 64, 66 may generate a signal in response to a request for status or other information from another device. For example, the door lock 60 may report whether it is in the locked or unlocked state in response to a status query. The door lock 60, via a keypad or other user input features, may be used to control devices on the RF mesh network 20 or to send signals outside the network, as discussed further below. The controller 70 or the RF mesh network gateway device 50 may generate signals in response to the actuation of a button 72, switch, or other control input, or in response to an automatic program (e.g., a periodic status check program that checks and stores the status of the devices in the network). The RF mesh network gateway device 50 may also generate signals in response to commands sent through the computer network connection 42, for example from a mobile device 30 or another networked computer 80, which can be transferred via a networked computer server 44 or the Internet.

As discussed above, the system 10 may also include a camera 90, which in one construction is a wireless digital camera. The camera 90 may be in direct communication with a computer network 40, for example through a wireless router 46 that is coupled to the computer network 40. Images from the camera 90 may be transmitted remotely to a user, either to a computer attached to the computer network 90 or to a mobile device 30 having capability to receive still images and/or video images. The camera 90 in one construction is linked into the RF mesh network 20 such that the camera 90 can be controlled by RF mesh network signals, although images from the camera 90 may be transferred directly to the computer network 40 independently of the RF mesh network 20, if desired.

The gateway device 50 provides an electronic data link between a cell phone and an access point within a home. The connection path from the cell phone to the access point involves cell phone connection to the internet, internet to a server, server to home router, home router to the gateway device 50, gateway device 50 to Z-wave enabled access point lock. In addition, the gateway device 50 is intended to communicate with any Z-wave enabled device such as lighting controls, thermostats, etc.

The illustrated gateway device 50 provides a secure data connection (e.g. using the secure socket layer, or "SSL", protocol) to an internet based server (MOSHI) thus providing protection against intrusion from internet based "hackers". Thus, the gateway device provides an SSL data connection in a home automation, low cost embedded device. On the Z-wave side, the communications that takes place will be encrypted according to the Zensys Security Command Class.

Implementing SSL encryption in this gateway device 50 requires a microprocessor with the appropriate resources such as program memory, random access memory, and speed. In addition, various SSL solutions are available and can be employed if desired. One such SSL solution is offered by Mocana Corporation and is very effective in the present application. SSL provides endpoint authentication and communications privacy over the Internet using cryptography. The protocols allow client/server applications to communicate in a way that is designed to prevent eavesdropping, tampering, and message forgery. SSL is the security protocol of choice, widely used in today's e-commerce environments.

The gateway 50 is powered by a small external power supply which provides permanent power to the device for its main purpose. During the initial setup of the gateway 50, it may be convenient or required that it be in close proximity to the Z-wave devices that a user wishes to control. For this reason, a 9-volt battery circuit is provided for temporary power.

The gateway 50 has several indicator LEDs used to provide "health" and network activity information. In addition, there are two buttons used to "enroll," or "learn in," Z-wave devices, or un-enroll them. These same two buttons also provide device reset functionality.

In operation, a consumer or user positions one or more devices within a home or other building that includes an RF mesh network 20. The mesh network includes the router 46 that communicates with a computer network 40 (e.g., a home network (wired or wireless), an Internet network, a wide-area network, a local-area network, etc.). The gateway device 50 facilitates communication between the devices 60, 62, 64, 66 of the mesh network and the router 46. Typically, the gateway device 50 must "translate" between the protocol used by the mesh network 20 (e.g., Z-WAVE) and the protocol employed by the router 46 and the network 40 (e.g., Internet Protocol, HTTP, etc.).

Each Z-wave device must be enrolled or learned in before it can be used, as described above. The typical module (light switch, thermostat, etc.) generally includes a physical enroll button on the exterior of the device. The gateway device also includes an enroll button. The lock includes an enroll button located behind the master code. This position hides the enroll "button" in the lock interior to reduce the likelihood of unwanted tampering. As discussed above, one method of enrolling the lock would require the user to position the gateway device adjacent the lock and then depress the enroll buttons on both the lock and the gateway device. The devices exchange information and the lock is enrolled. The lock is then assembled to hide the enroll button. Of course, other enrollment methods are possible.

In one exemplary implementation of the invention, a homeowner employs a door lock 60, a camera 90, and a light at a particular entrance to the home. Each of the light, the door lock 60, and the camera 90 are mesh network-compatible devices but they must be learned-in to the mesh network 20 of the home. The homeowner disconnects the gateway device 50 from the router 46 (if connected via a wire) and disconnects the A/C power supply from the gateway device 50. The gateway device 50 is powered by batteries or another portable power supply and continues to communicate with the mesh network 20. The gateway device 50 is positioned adjacent one of the new mesh network devices and a "learn-in" sequence is initiated. During the learn-in sequence, information is exchanged between the device and the gateway 50 to assure that the device properly communicates with only the correct mesh network following the learn-in. This process is repeated with each mesh network device.

Once the devices are integrated into the mesh network, the homeowner is able to actuate, control, and access the devices using other network devices such as networked computers 80 (including computers networked via the Internet) and cell phones 30. For example, the homeowner could program the door lock 60 to transmit a signal to a cell phone 30 in response to actuation of a doorbell or an attempted entry into the home. The user could then send a signal from the cell phone 30 to turn on the light and could access the video from the camera 90 to determine who is at the door. If the party at the door is someone for whom the home owner wishes to allow entry, the homeowner could send a signal that unlocks the door. In constructions in which the door lock 60 includes a visual display or an audio device, the home owner could even welcome the individual into the home. If on the other hand, the person at the door is unwelcome, the home owner could actuate an audible alarm to scare the individual from the premises, or initiate an alarm that notifies the police.

Figure 6:
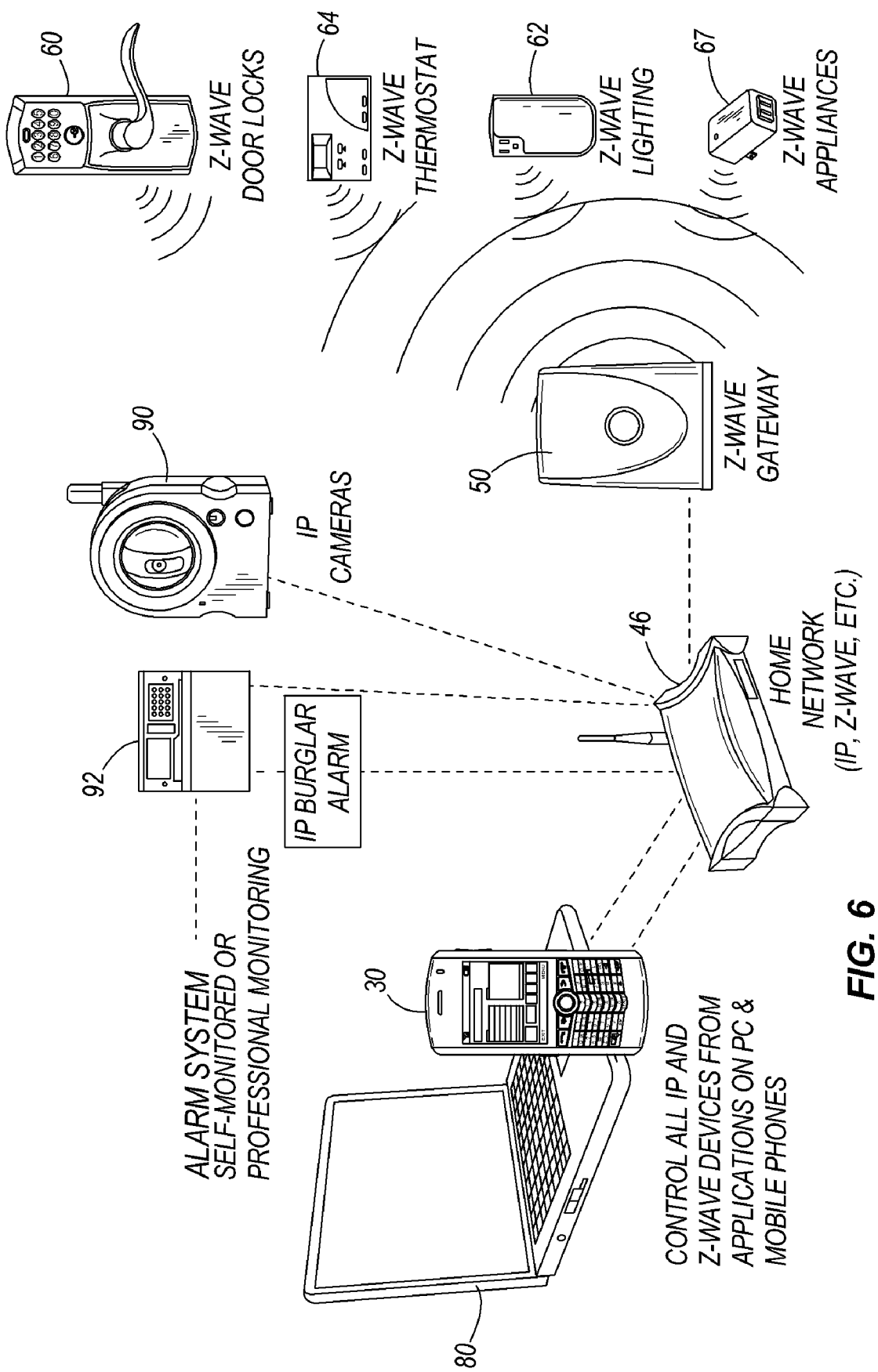
FIG. 6 is a diagram of the system of FIG. 1 with the addition of a networked computer server, additional RF mesh network devices, and IP devices.

FIG. 6 schematically illustrates an arrangement of components commonly found in homes or businesses but incorporating the present invention. In this arrangement, some of the components communicate via the mesh network using the Z-wave protocol. In this example, door locks 60, thermostats 64, lighting controls 62, appliances 67 (e.g., coffee maker, television, etc.), window blind controls, and the like employ the Z-wave protocol to communicate via the mesh network and the Z-wave gateway 50. The Z-wave gateway 50 then communicates with the network router 46 as described above with regard to FIGS. 1-5. Other devices communicate directly with the network router 46. In the illustrated arrangement, cameras 90 and a burglar alarm 92 are IP devices that communicate using the network router 46. Of course some or all of the IP devices could be mesh network devices that communicate via the Z-wave gateway, while some of the mesh network devices could be IP devices if desired.

As was described with regard to FIGS. 1-5, the network router 46 of FIG. 6 communicates with the Internet and allows users to access the various devices via an Internet accessible computer or a cell phone if desired.

Figure 7:
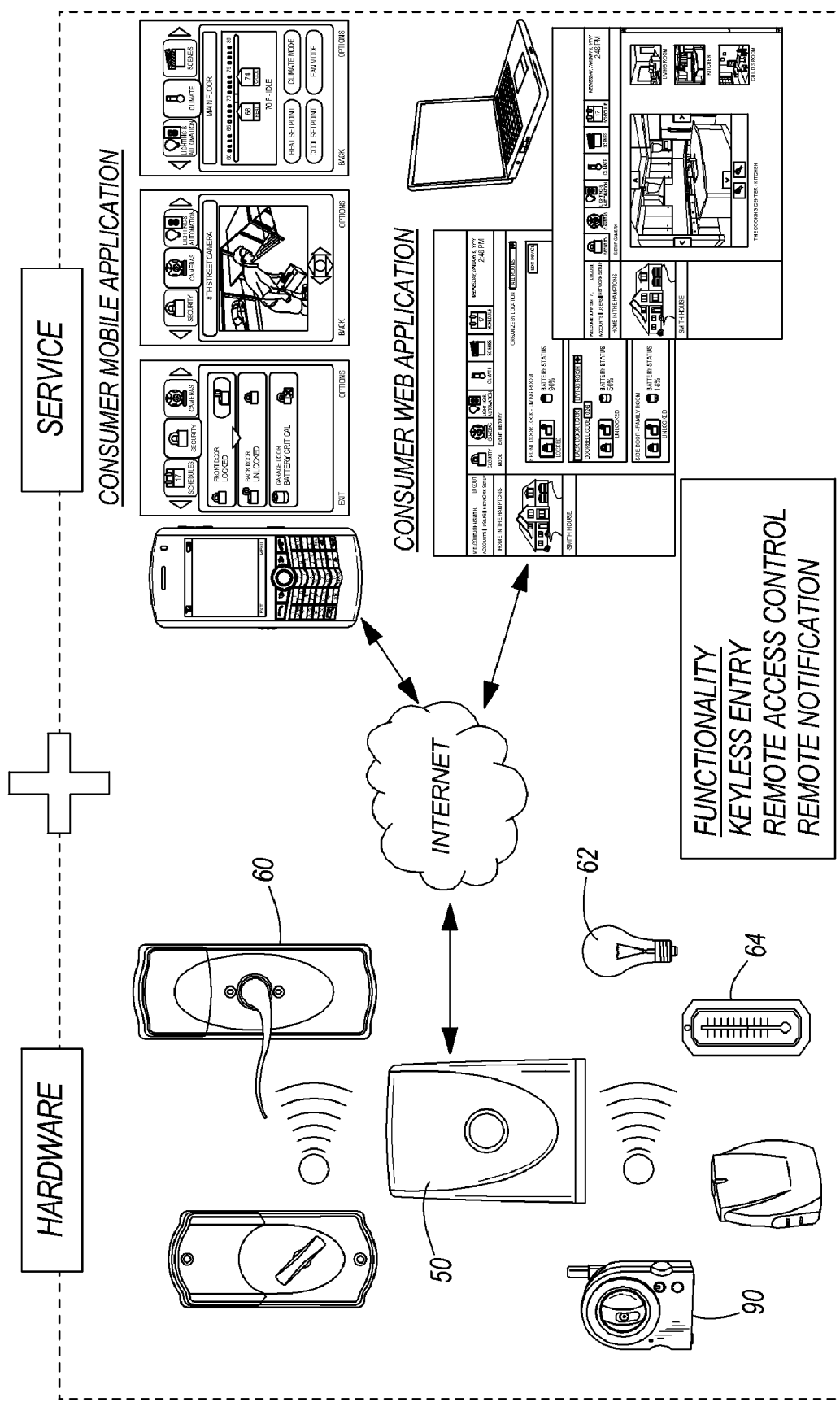
FIG. 7 is a diagram illustrating the communication between the RF devices, the Internet, a web application, and a mobile application.

FIG. 7 is similar to FIG. 2 and better illustrates how the Z-wave router communicates via the Internet with either a consumer mobile application or a consumer web application. Both applications provide similar controls and include a graphical interface like the ones illustrated in FIGS. 8-31.

FIGS. 8-24 illustrate various views of the Graphical User Interface of the mobile application. It should be noted that the mobile application illustrated herein is intended to be an application that is downloaded to the user's particular phone and is not a web based application accessed by the phone. This arrangement provides for greater speed in processing the various windows and provides greater functionality. Of course, a user could access the web based application using a phone if desired.

Figure 8:
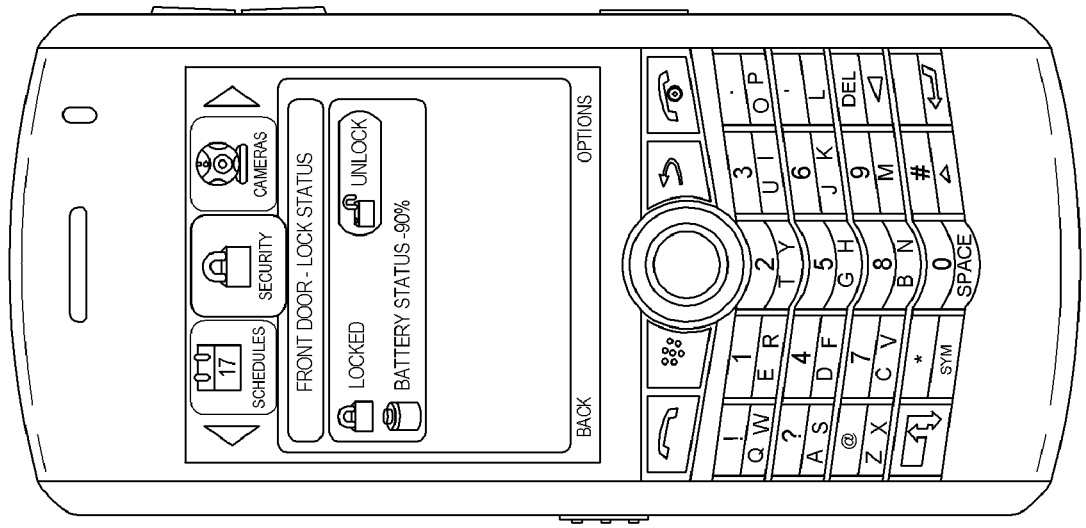
FIG. 8 illustrates a first Security window displayed on a mobile device.
Figure 9:
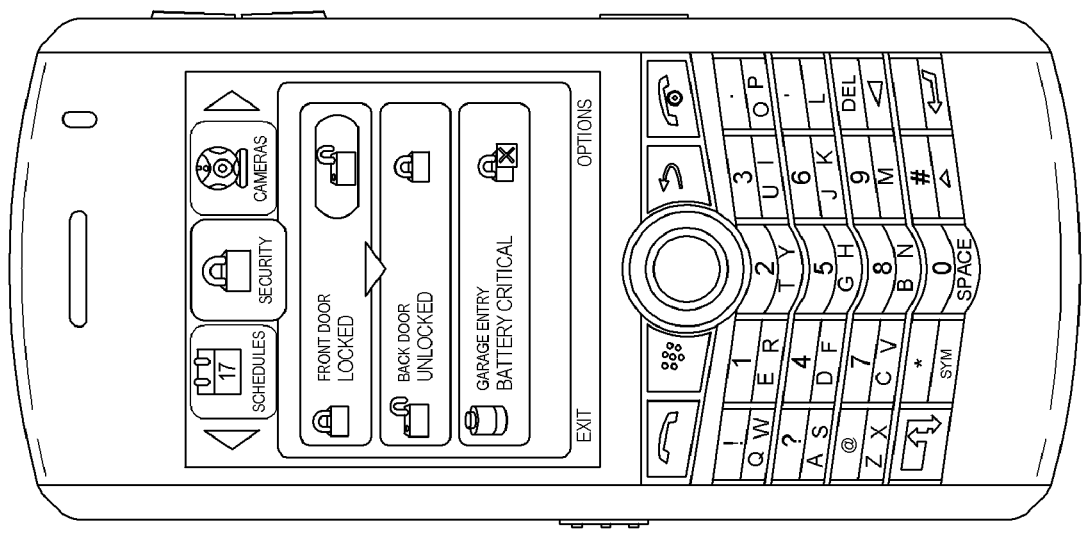
FIG. 9 illustrates a second Security window displayed on a mobile device.

FIGS. 8 and 9 illustrate two security windows of the graphical user interface as they might appear on a BLACKBERRY Smartphone. Of course, any phone capable of supporting the application could display the views illustrated herein.

Figure 10:
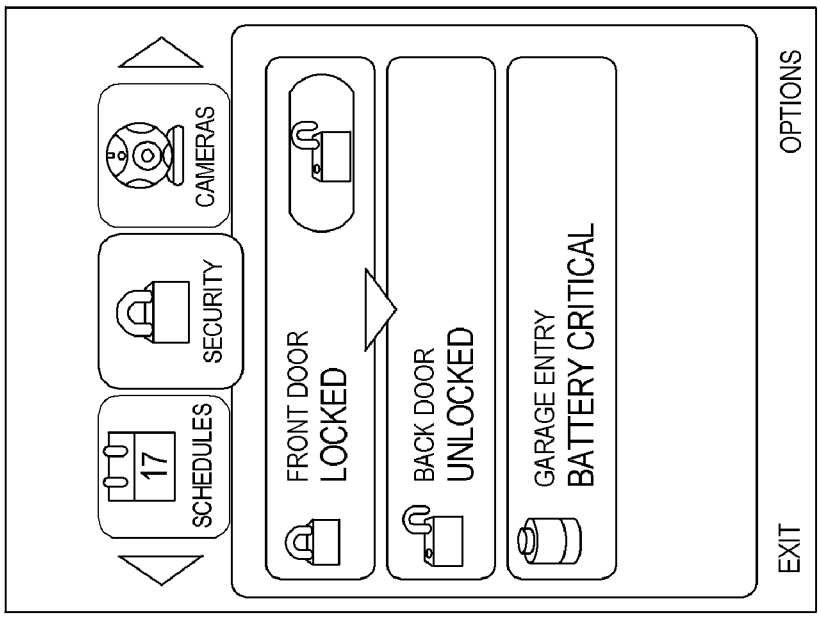
FIG. 10 is an enlarged view of the window of FIG. 8.

FIG. 8 illustrates a status window that shows the status of the various door locks within a home. FIG. 10 illustrates the window in greater detail. With reference to FIG. 10, the window provides a navigation bar at the top that allows the user to select the high level menu. In the illustrated construction, the high level menus include, but are not limited to, Schedules, Security, Cameras, Lighting & Automation, Climate, and Scenes. In FIGS. 8-11 Security has been selected.

Figure 11:
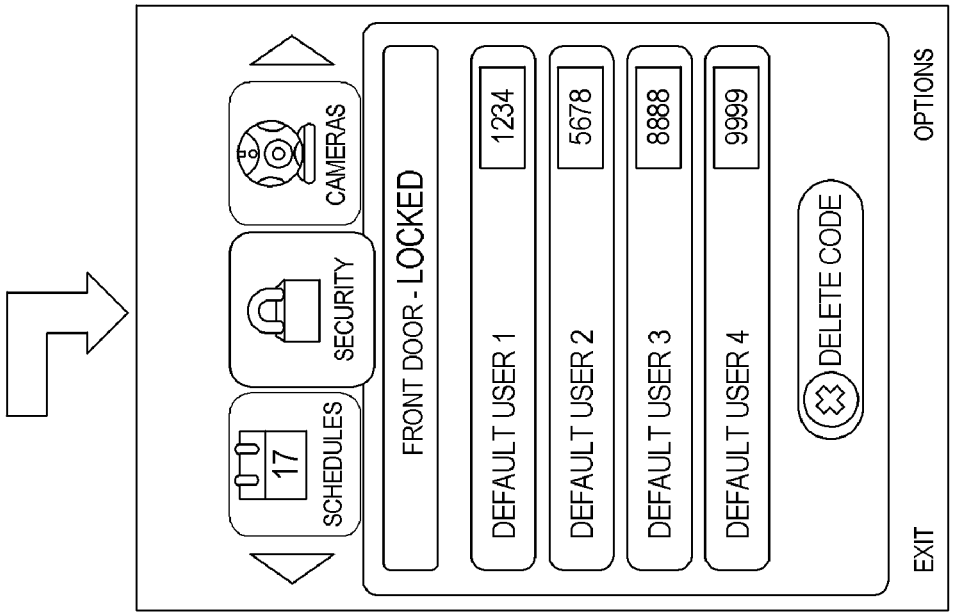
FIG. 11 is a third Security window displayable on a mobile device.

The window of FIGS. 8 and 10 allows a user to immediately visually determine the status of each door lock. The user can than select a particular lock to determine the battery status of that lock, as illustrated in FIG. 9. In addition, the user can select a particular lock to view, add, delete, or otherwise modify the users and their codes for a particular door as illustrated in FIG. 11.

Figure 12:
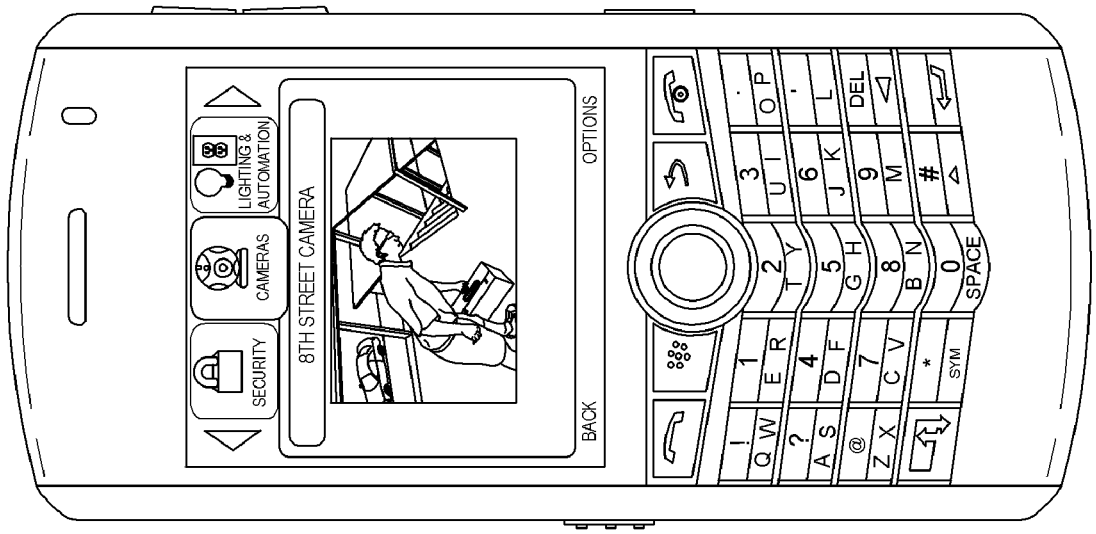
FIG. 12 illustrates a first Camera window displayed on a mobile device.
Figure 13:
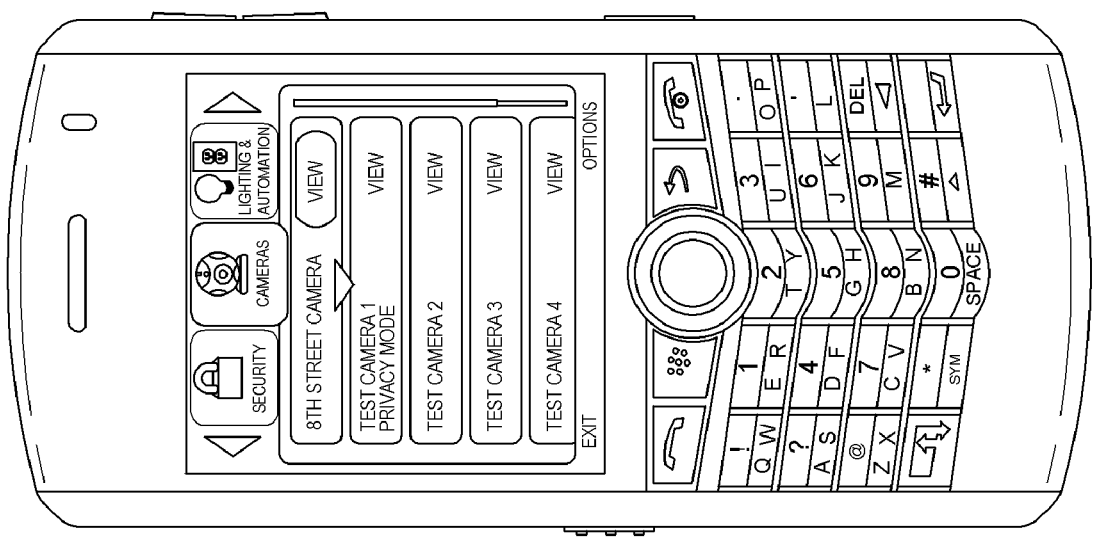
FIG. 13 illustrates a second Camera window displayed on a mobile device.
Figure 15:
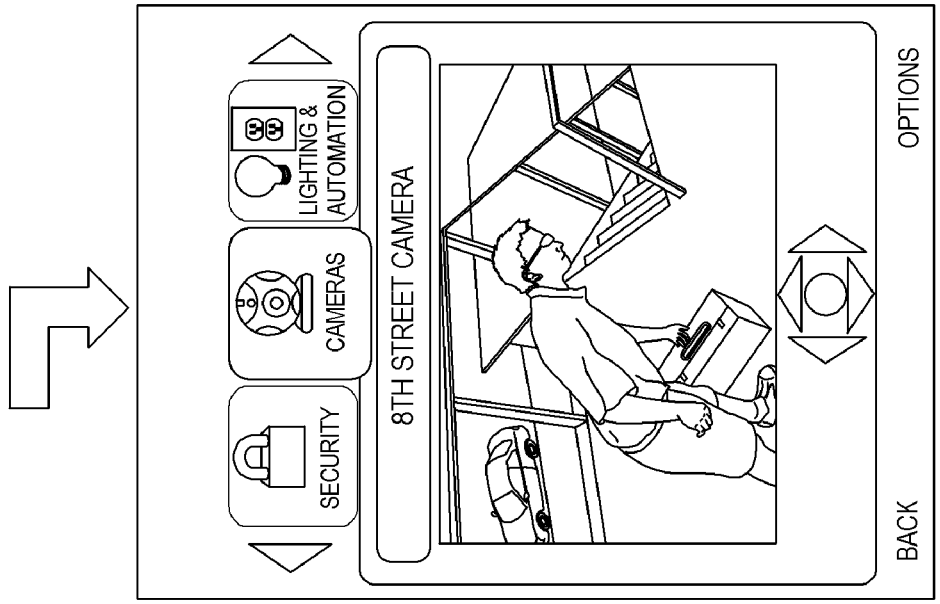
FIG. 15 is an enlarged view of the window of FIG. 13.
Figure 14:
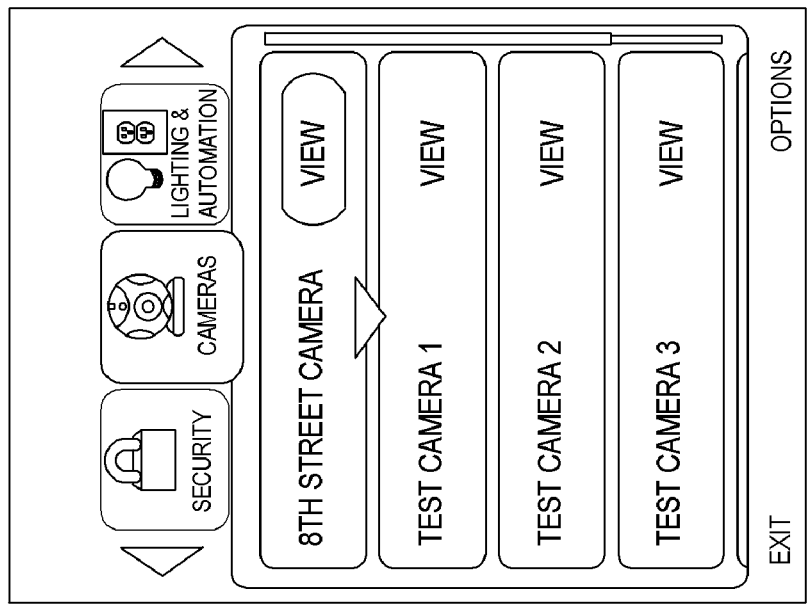
FIG. 14 is an enlarged view of the window of FIG. 12.

FIGS. 12-15 illustrate various windows that are available under the Cameras high level menu. FIGS. 12 and 14 illustrate a window that provides a list of the available cameras for the user. The user can select any of the available cameras from this menu to view recent or current images from that camera. FIGS. 13 and 15 illustrate the view from one of the cameras. As can be seen in FIG. 15, the user is provided with a scroll pad that allows the user to tilt the camera up or down or rotate the camera left or right if such functionality is provided by the particular camera.

Figure 16:
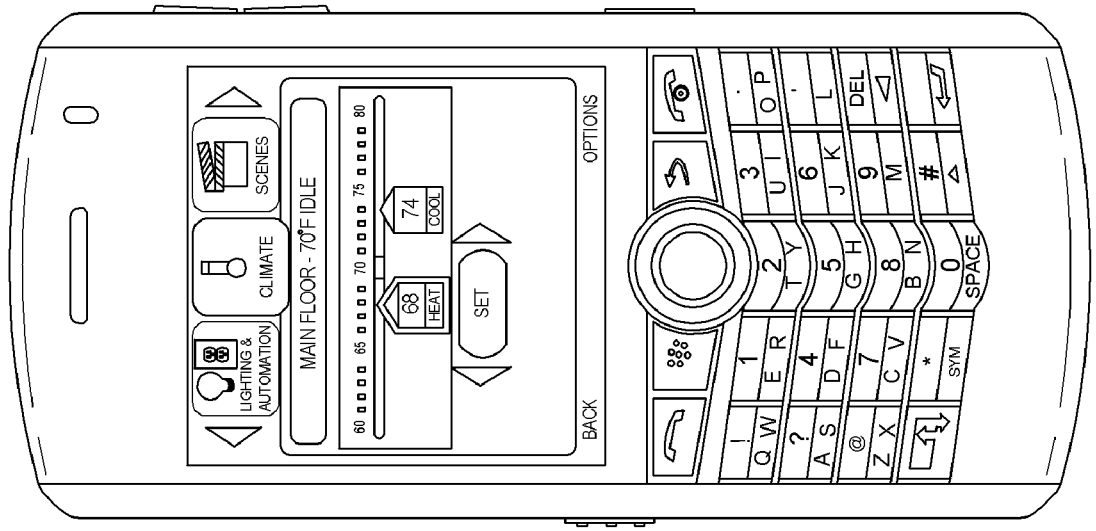
FIG. 16 illustrates a first Lighting & Automation window displayed on a mobile device.
Figures 17, 18:
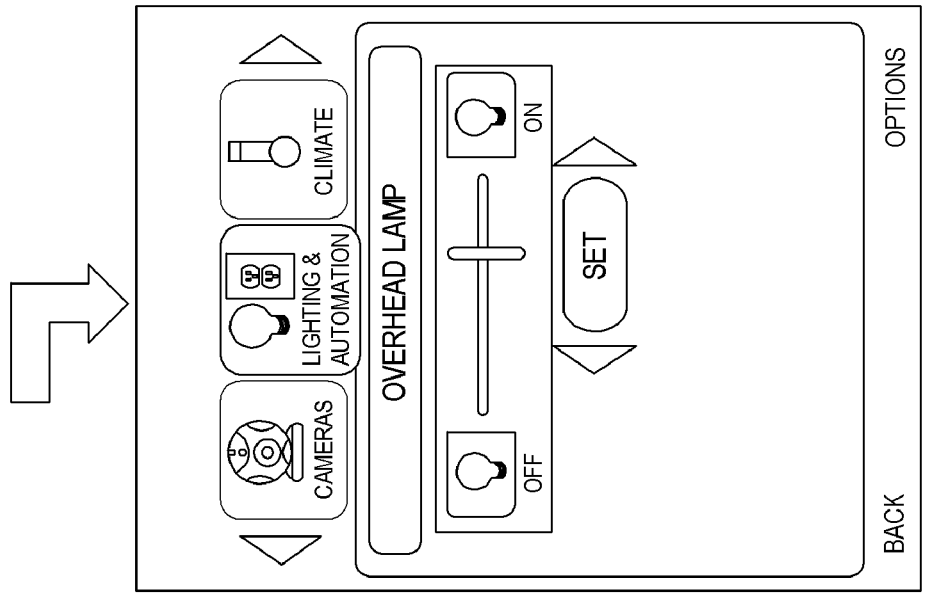
FIG. 17 is an enlarged view of the window of FIG. 16.
FIG. 18 illustrates an enlarged view of a second Lighting & Automation window displayable on a mobile device.

FIGS. 16-18 illustrate some of the windows available under the Lighting & Automation high level menu. FIGS. 16 and 17 illustrate a window that provides the user with a listing of each light or other automated item (e.g., blinds, shades, coffee maker, other appliances, etc.) that is controllable by the user along with the current status. If the user wishes to change or adjust the status of an item, the user simply selects that item to transition the display to that illustrated in FIG. 18. The particular control selected includes a dimmer that allows the user to not only turn the light on or off but to also select the illumination level. A similar control might be provided for window blinds, thereby allowing the user to partially open or close any particular blinds within the home. Still other controls provide a simple on or off choice.

Figure 19:
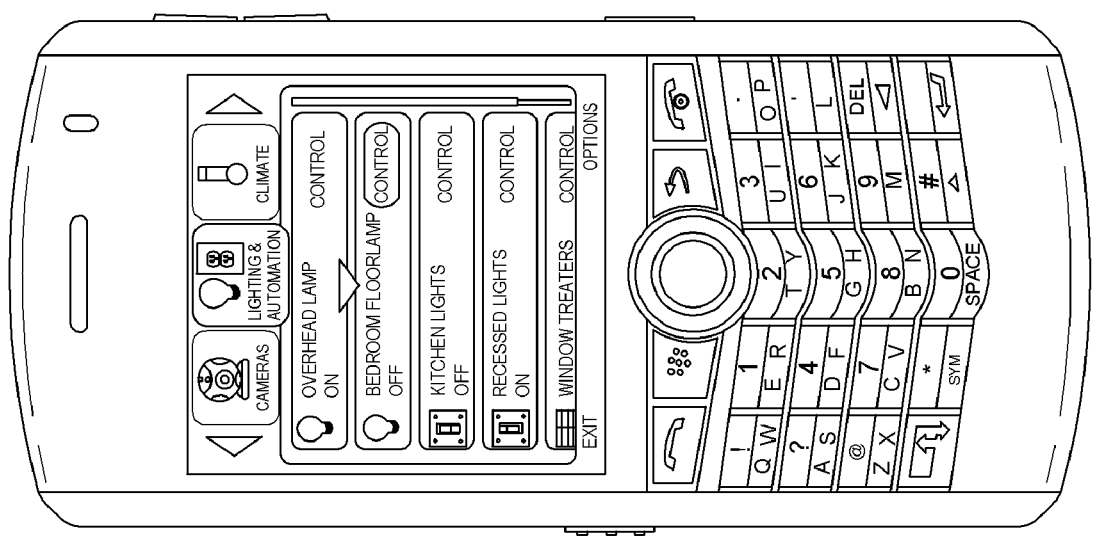
FIG. 19 illustrates a first Climate window displayed on a mobile device.

FIGS. 19-22 illustrate various windows that are available under the Climate high level menu. FIG. 20 illustrates a status window that again provides the user with a list of the available climate control devices available for adjustment. In the illustrated construction, there is a main floor control and an upstairs control. The status of each is illustrated and would include idle, heating, cooling, or off as a possible status. The user can select one of the available controls to get additional information about the settings of the control and/or to adjust the settings of the control. FIG. 21 illustrates the window for the main floor and illustrates the available adjustments. In this construction, the user can adjust the fan mode (e.g., on, off, cycling, etc.), the climate mode (e.g., heating, cooling, off, etc.), the heat set point, and the cool set point. FIGS. 19 and 22 illustrate the window that is provided when the user selects one of the available adjustments. In this case, the user has selected the heat set point for adjustment. The user is provided with two arrows that allow the user to adjust the heat set point up or down as may be desired.

Figure 23:
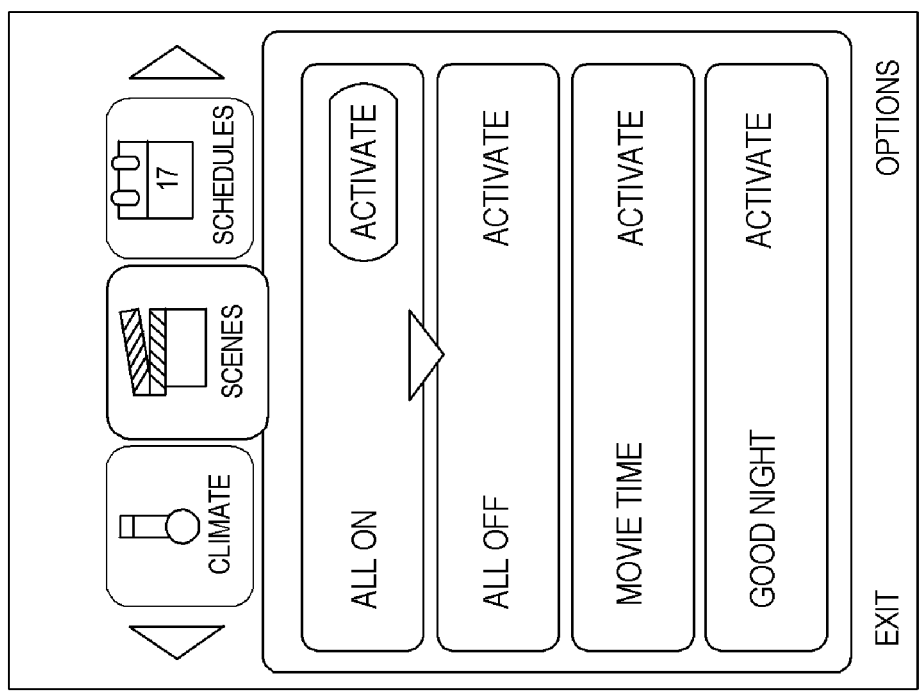
FIG. 23 illustrates an enlarged view of a first Scene window displayable on a mobile device.

FIG. 23 illustrates the window provided to the user under the Scenes high level menu. Scenes are preprogrammed settings for various components controlled by the system. For example, a "Work" scene could be programmed in which all of the lights are turned off and the climate control system is set to an energy saving mode. The scene would then transition to a "Home" status at a particular time or following a particular event. FIG. 23 illustrates several available scenes. An "All On" scene would turn on all available lights in the home, while the "All Off" scene turns off all of the lights. The "Movie Time" scene may leave a few lights on for background lighting and could activate a home theater system. The "Good Night" scene could turn off all but a few lights, activate portions of a security system, and set a start time for a coffee machine in the morning. The user can select any scene desired and activate or deactivate that scene as desired. Scenes can also be created or deleted using the mobile application.

Figure 24:
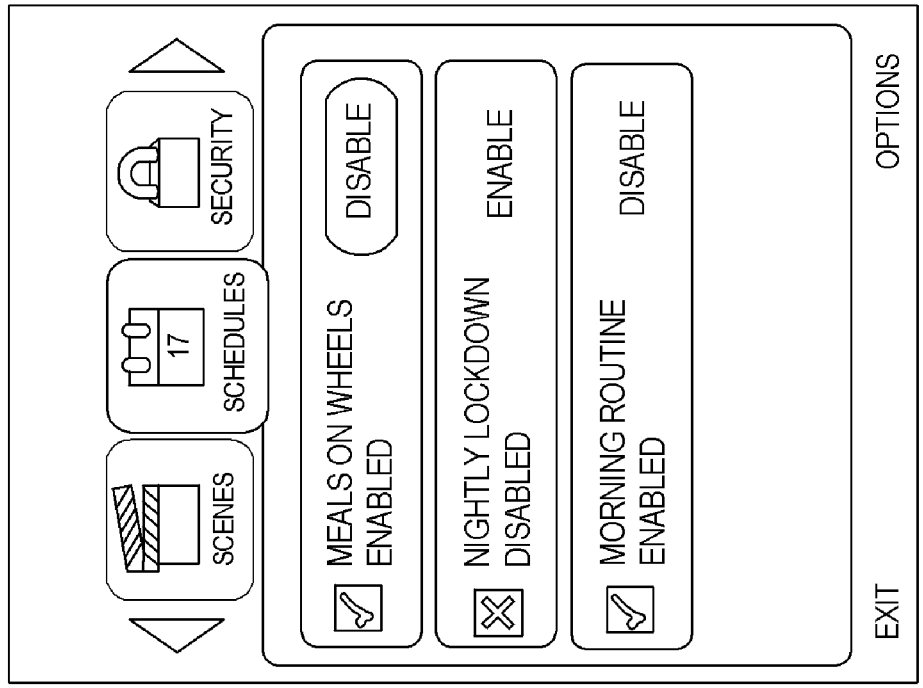
FIG. 24 illustrates an enlarged view of a first Schedules window displayable on a mobile device.

FIG. 24 illustrates the window provided upon the selection of the Schedules section of the high level menu. As with the other high level menu selections, the user is again provided with a list of available schedules to choose from. Schedules are preprogrammed events or sequences of events that are programmed to occur at regular times. For example, the morning routine may increase the temperature of the house, start a coffee machine, and increase the temperature of the water in a water heater all prior to the user waking. Again, the user simply enables or disables schedules as desired and can create or delete schedules using the mobile application.

FIGS. 25-31 illustrate some of the various windows available to a user when the user is using the web application. The same functionality provided by the mobile application is available using the web application and many of the windows appear similar.

FIG. 25 illustrates a log on screen that is similar to those used by many applications. The user accesses the web application through this window. Once through the log on screen, the user enters a Function Page that is based on the selected high level menu item selected.

Figure 26:
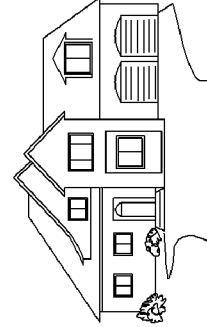
FIG. 26 illustrates a Security Function page of the web application.

FIG. 26 illustrates the window provided under the Security high level menu. As can be seen, the functionality is very similar to that provided in the mobile application. The user is provided with a list of available locks, including their battery status, and can select, edit, and/or modify the status of any of the locks as desired. In the illustrated construction, the user has selected the back door lock. Once selected, the interface displays the users that have access to that lock and the location of the door in the home. The user can change any of these features if desired. It should be noted that the list of locks can also be sorted by room if desired to aid in finding a particular lock.

Figure 27:
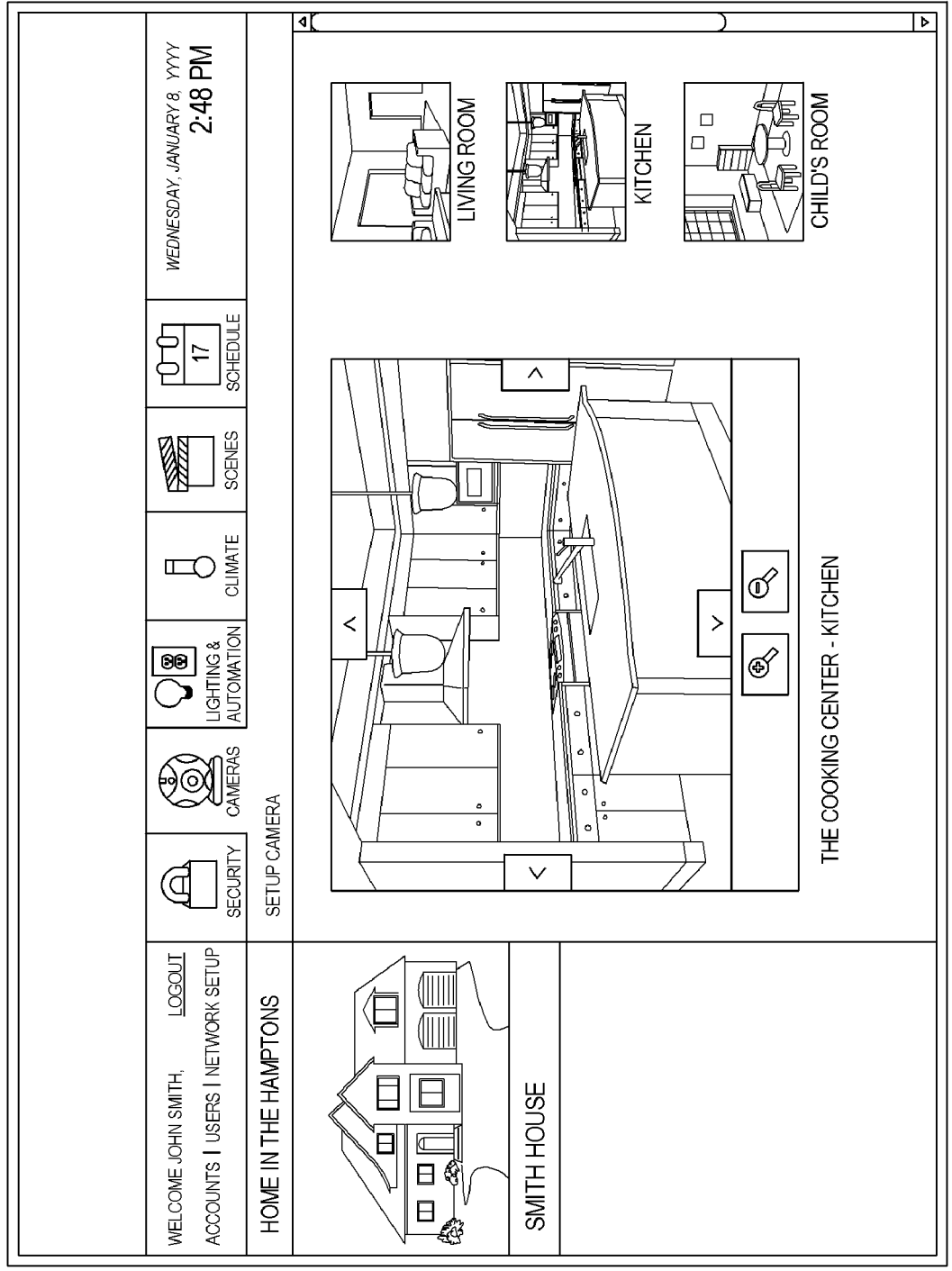
FIG. 27 illustrates a Cameras Function page of the web application.

FIG. 27 illustrates the window provided under the Camera high level menu. In this application, the available cameras are listed along the side with a thumbnail image of the room or area they are positioned to view. The user can select any of these images to be displayed in the larger display window. In the web application, the user is provided with arrows at the top, bottom, right, and left of the image to allow tilting and panning of the camera. The user is also provided with a zoom control to allow the user to zoom in and out. Of course, this functionality can be limited or expanded depending on the functionality of the particular camera employed.

Figure 28:
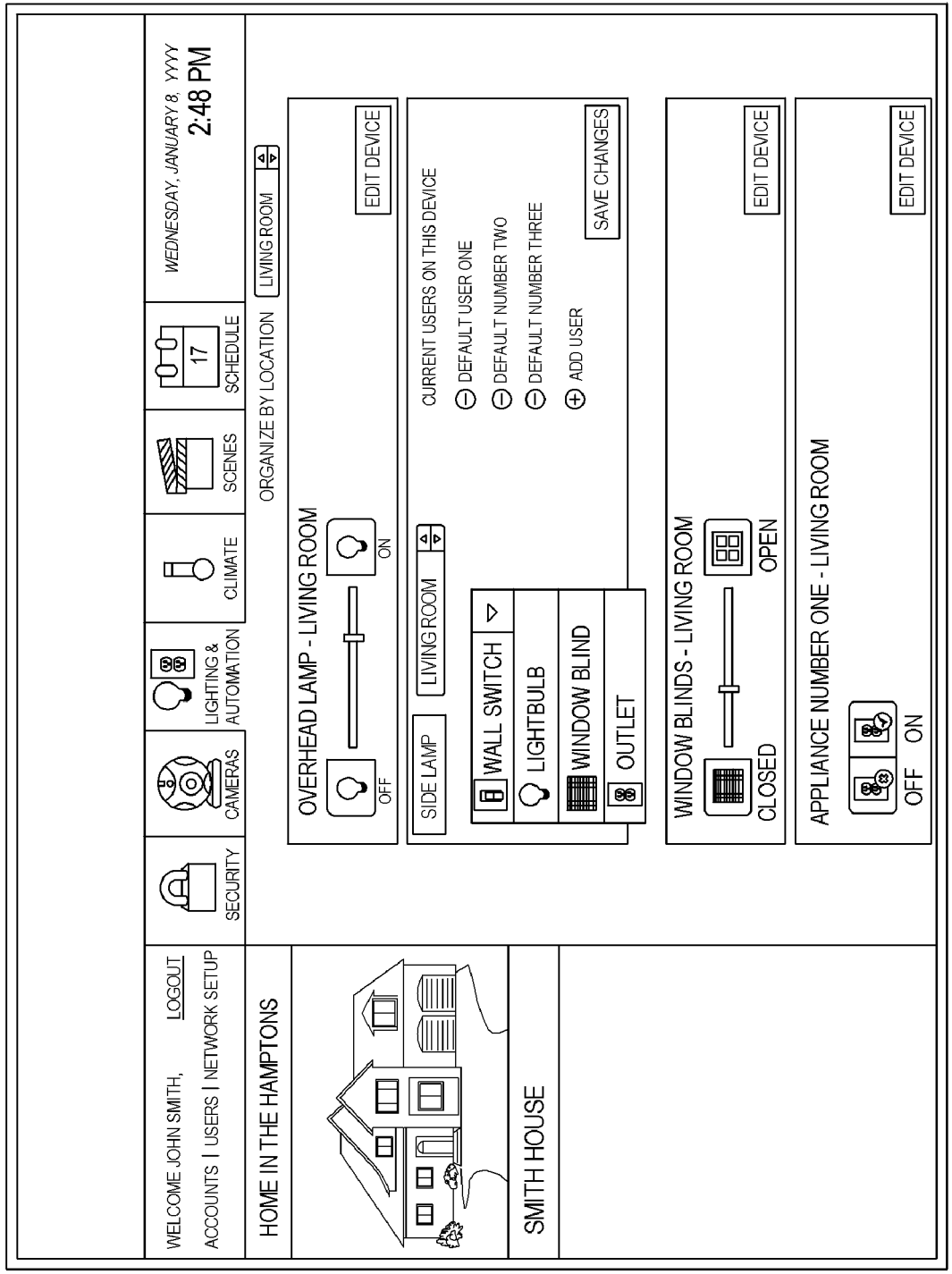
FIG. 28 illustrates a Lighting & Automation Function page of the web application.

FIG. 28 illustrates the window provided under the Lighting & Automation high level menu. While the available controls can be listed in any order, the window of FIG. 28 illustrates the controls arranged by location, in this case with the Living Room selected. The first control is for an overhead lamp and includes a dimmer that can be controlled by the user to select the particular illumination. As with the mobile application, the web application lists each control with its status to provide the user with immediate visual feedback of the status of various items within the home.

Figure 29:
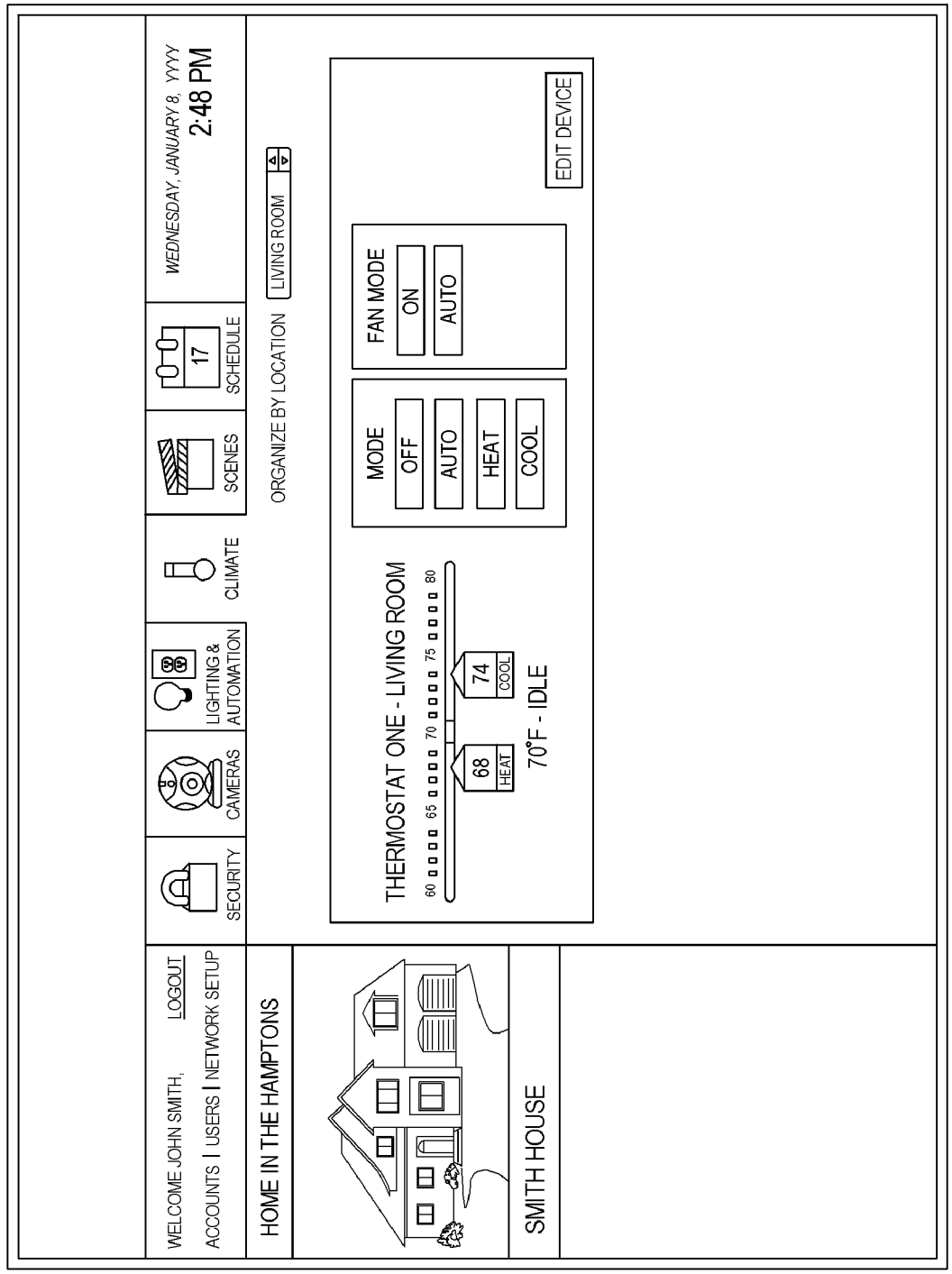
FIG. 29 illustrates a Climate Function page of the web application.

FIG. 29 illustrates one of the available windows under the Climate high level menu. Again, the list provided is arranged by location and therefore lists only the control in the living room. However, if the user were to list the controls for the entire home, other controls would also be listed. As with the mobile application, the user is presented with the available adjustments and can adjust any controllable aspect of the thermostat.

Figure 30:
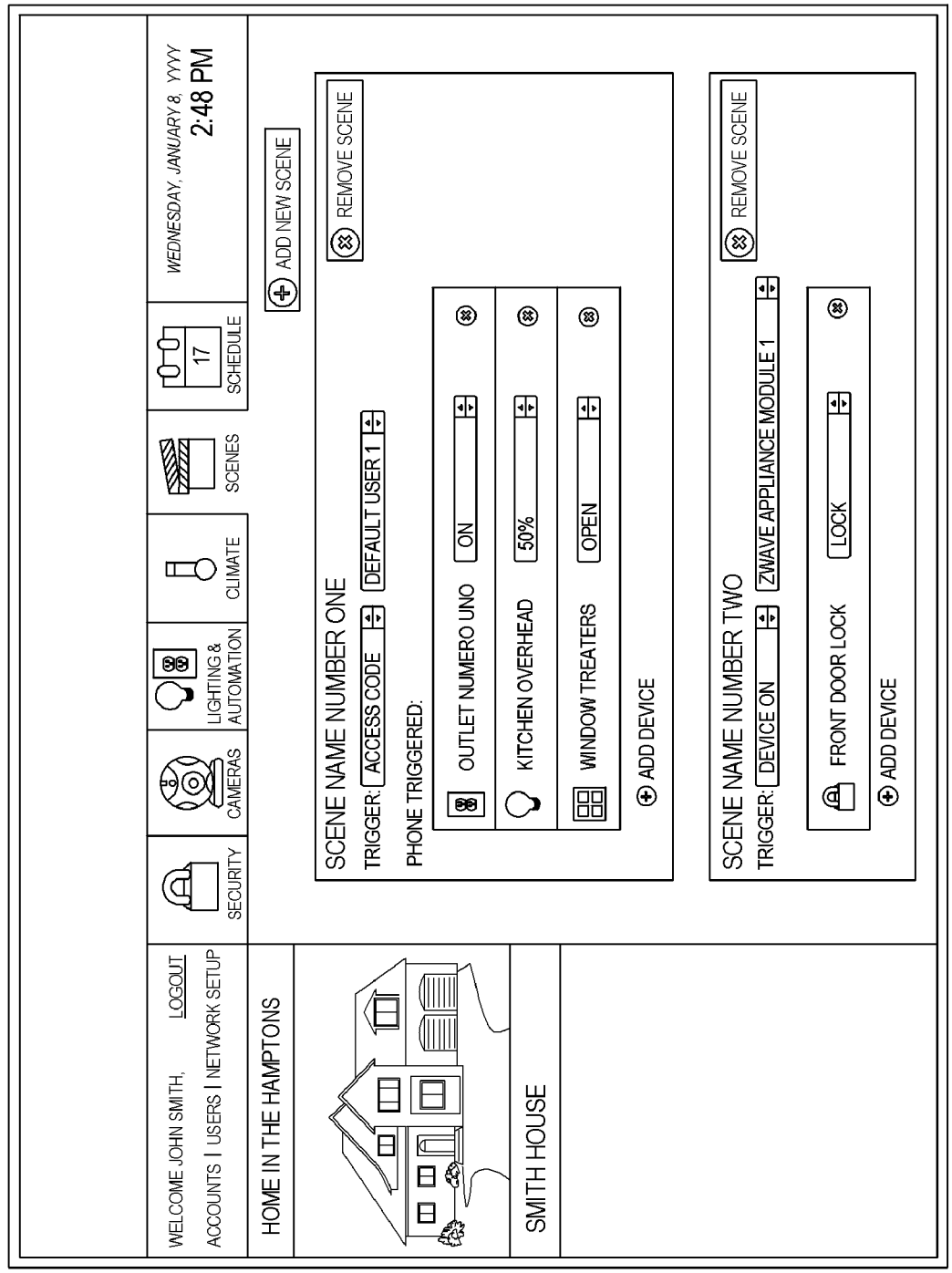
FIG. 30 illustrates a Scenes Function page of the web application.

FIG. 30 illustrates one of the available windows under the Scenes high level menu. The user is provided with a list of available scenes and can select one of the scenes to view the various events within the scene, edit the events, or add new events as desired. In the illustrated construction Scene Number One is selected. The trigger for the scene is the entry of the access code of user number one. Upon entry of this code, the scene will activate and will turn on Outlet Numero Uno, will turn the overhead kitchen lights to 50 percent, and will open the Winder Treaters. Thus, when the user enters the home, the lights are on and the window blinds are open. Outlet Numero Uno may power a television that turns on upon entry of the user. The user has the ability to add new scenes or delete scenes using this window if desired. It should be noted that any device (e.g., light switch, thermostat, window blind control, appliance, etc.) can initiate a scene. The illustrated construction describes a scene initiated by a lock for exemplary purposes only.

Figure 31:
FIG. 31 illustrates a Schedules Function page of the web application.

FIG. 31 illustrates one of the available windows under the Schedule high level menu. Again, the user is presented with a list of available schedules with the ability to add, delete, or select schedules. In the construction illustrated in FIG. 31, the user has selected a one time schedule in which between 11:00 AM and 12:00 PM on Feb. 24, 2008 the Kitchen Overhead lights will be on and the Window Treaters will be closed. Other scheduled can be created on a daily, weekly, or monthly basis if desired.

It should be noted that the invention is described as being used in conjunction with an RF mesh network. However, other constructions could employ other network arrangements such as non-mesh networks or other communication modes such as infrared or wired communication. As such, the invention should not be limited to use with only RF mesh networks.

Following is a description of a particular construction of the system 10 described above as part of a building alarm system 200. Building alarm systems may include a control and a plurality of sensors located at various points of access into the building such as windows and doors. A building alarm system may include motion sensors at various locations within the building. The door or window sensors each provide a signal when the particular barrier (e.g. window or door) is displaced relative to a frame, thereby indicating to the control that the barrier (e.g. window or door) has been opened. When the alarm control is operating in an armed mode, the control will operate certain alarm devices (e.g., siren, auto dialer, etc.) either when the signal is received or after a certain period of time after receipt (i.e., a delay period).

Figure 34:
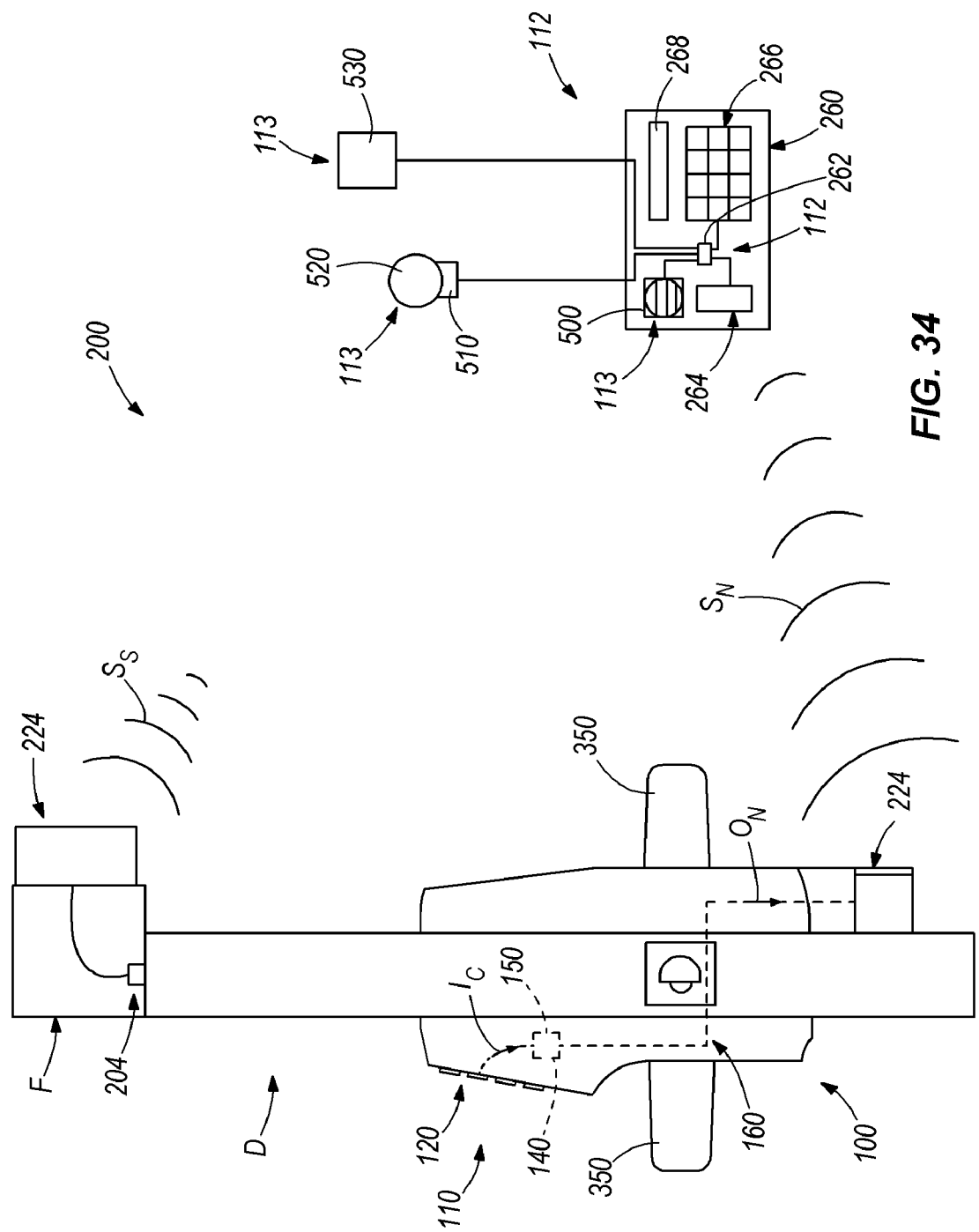
FIG. 34 is side elevational view of a lock system including the control assembly and an alarm control.
Figure 36:
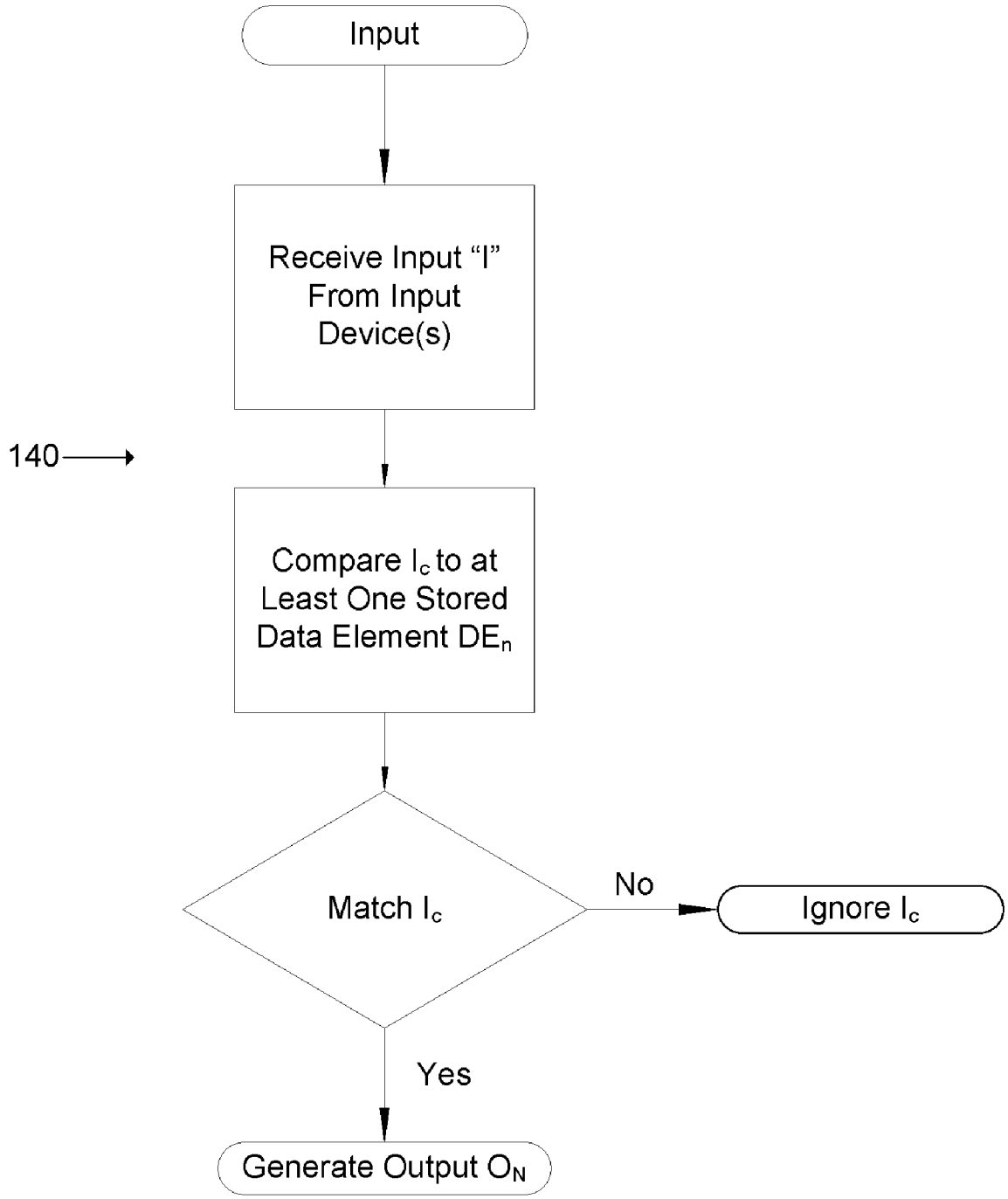
FIG. 36 is logic diagram of the basic operation of the access control assembly.

In one construction, the building alarm system 200 includes a lock system 100 including a control assembly 110 for an access door D. As used herein, the term "door" is intended to mean any type of moveable barrier for providing selective obstruction of an access opening, such as a conventional door, a gate, a hatch, or any other such device. The door D is movably disposed within a frame F (e.g., door frame, fence structure, etc.) and the building alarm system 200 includes an alarm control 112 and/or one or more alarm devices 113. The control assembly 110 preferably provides a portion of the lock system 100 and includes an input device 120 and an access control 140. The input device 120 is disposed on and/or adjacent to the door D and is configured to at least one of receive an input $I_C$ and generate an input $I_C$; i.e., the input device 120 may be constructed, programmed, etc. to only receive an input $I_C$ (i.e., through a credential or key), only generate an input $I_C$ (e.g., by means of a keypad), or to both receive and/or generate an input $I_C$. Further, the access control 140 has at least one stored value or data element $DE_N$ and is configured to at least receive the "lock" input $I_C$, to compare the input $I_C$ with at least one stored data element $DE_N$, and to generate and transmit an output $O_N$ to the alarm control 112 and/or directly to the alarm device(s) 113, as indicated in FIGS. 34 and 36.

Figure 40:
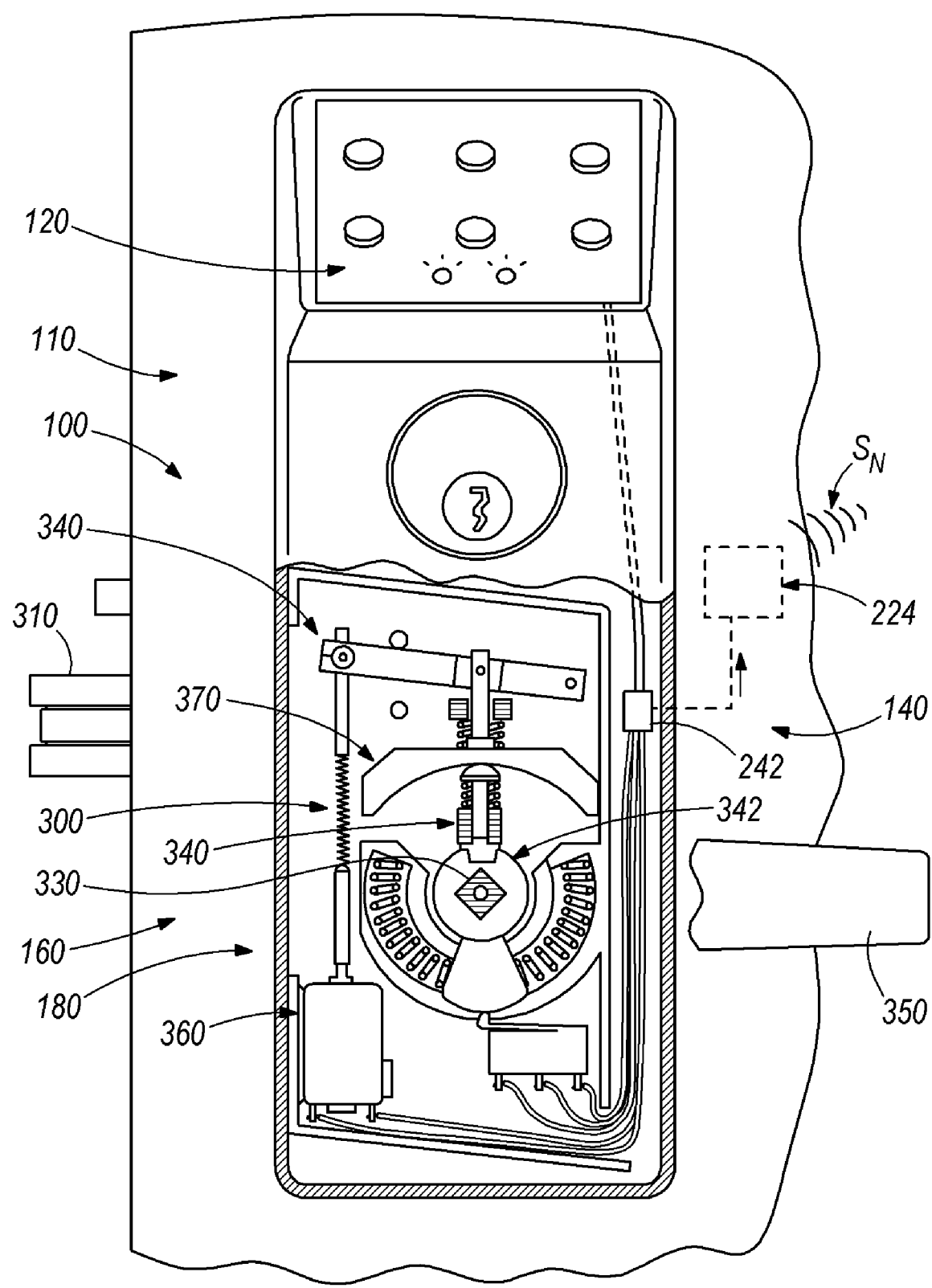
FIG. 40 is a partially broken-away, front elevational view of an electromechanical lock system incorporating the control assembly.
Figure 42:
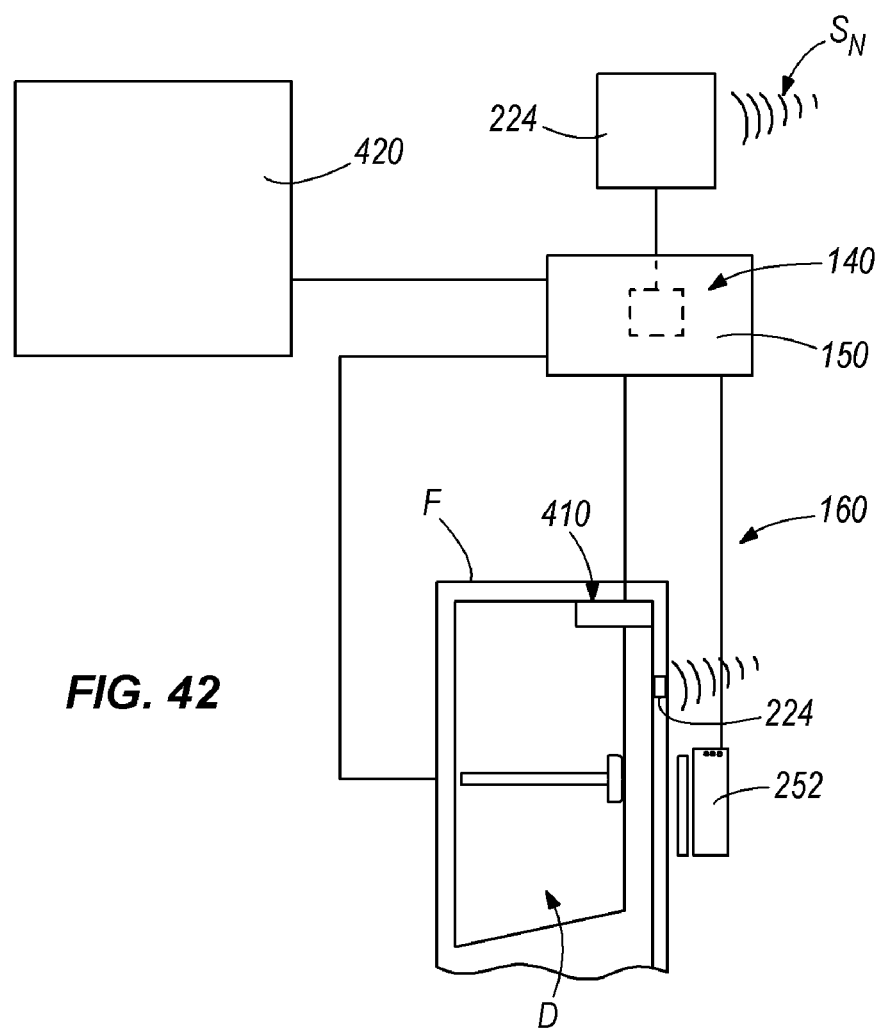
FIG. 42 is a diagrammatic view of an electromagnetic lock system incorporating the control assembly.

More specifically, as discussed above, the control assembly 110 is preferably incorporated into a lock system 100 that further comprises a lock 160 adjustable between a locked configuration and an unlocked configuration, as shown in FIGS. 40 and 42. That is, the lock 160 is configured to secure the door D within the frame F when arranged in the locked configuration, and alternatively the door D is displaceable with respect to the frame F when the lock 160 is arranged in the unlocked configuration. Preferably, at least a portion of the lock 160 (e.g., a latch, deadbolt, or spindle) is coupled with either the door D and the frame F, and is configured to releasably engage with the other one of the door D and the frame F, when arranged in the locked configuration, so as to secure the door D within the frame F.

Figure 37:
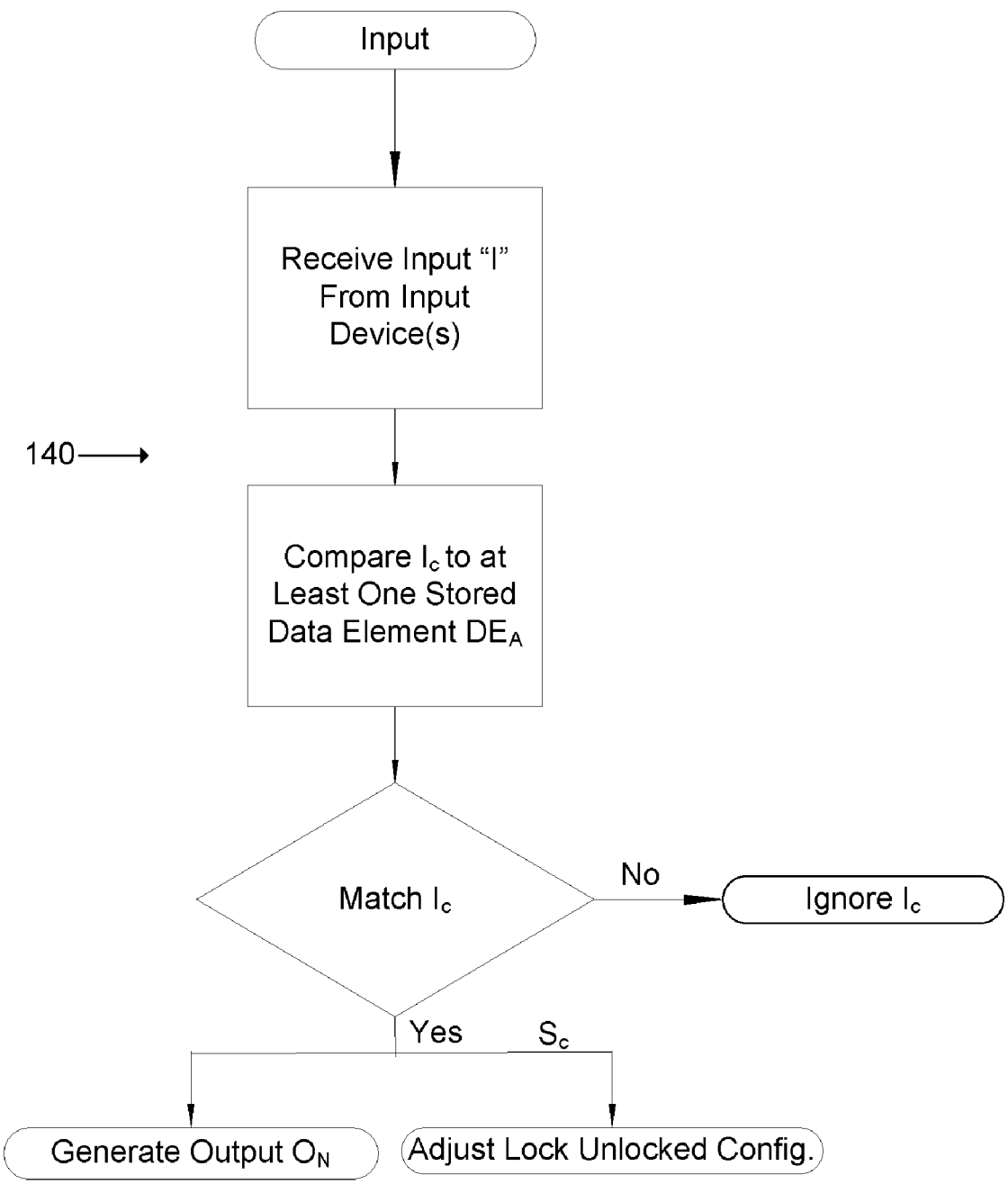
FIG. 37 is another logic diagram of the control assembly, shown operating a lock.

When the control assembly 110 is used with a lock 160, the access control 140 is or includes a lock control 150 operatively coupled with the lock 160. The lock control 150 is configured to operate the lock 160 when the input $I_C$ corresponds with the stored value/data element $DE_N$ such that the lock 160 is adjusted to the unlocked configuration, as indicated in FIG. 37. That is, when the lock control 150 determines that there is some predetermined correlation between the lock input $I_C$ and the stored data element $DE_N$ (e.g., an exact or substantial match, a partial match, etc.), the control 150 either operates the lock 160 directly or sends a control signal $S_c$ to a portion of the lock 160 (e.g., an actuator) as discussed below, such that the lock 160 is adjusted to the unlocked configuration to enable the door D to be "opened". The access control 140 or the lock 160 can include an actuator 180 configured to adjust the lock 160 between the locked and unlocked configurations; in other words, the actuator 180 may be considered part of the lock control 150 or as part of the lock 160 itself. In either case, the lock control 150 is configured to operate the actuator 180 such that the lock 160 is adjusted to the unlocked configuration when there is correspondence between the input $I_C$ and the stored data element $DE_N$, as described in greater detail below.

Although the control assembly 110 can be incorporated into the lock system 100 so as to be capable of operating the lock 160, in other constructions the control assembly 110 may share only certain components with the lock 160 or even be completely separate from any lock. For example, the lock system 100 may include a separate control (not shown) for operating the lock 160 that receives the same input $I_C$ from the input device 120, such that the access control 140 only functions to communicate with the alarm control 112 and/or alarm device(s) 113. In another example, the input device 120 and the access control 140 may function solely to disarm the security features of the building alarm system 200 that includes one or more doors D each with a purely mechanical lock (e.g., key-operated cylinder lock). As yet another example, the control assembly 110 may function to communicate with a home automation system 115 (described below) or any other system, and not with a security system. The scope of the present invention includes these and all other appropriate alternative configurations of the control assembly 110 that function generally as described herein.

Figure 38:
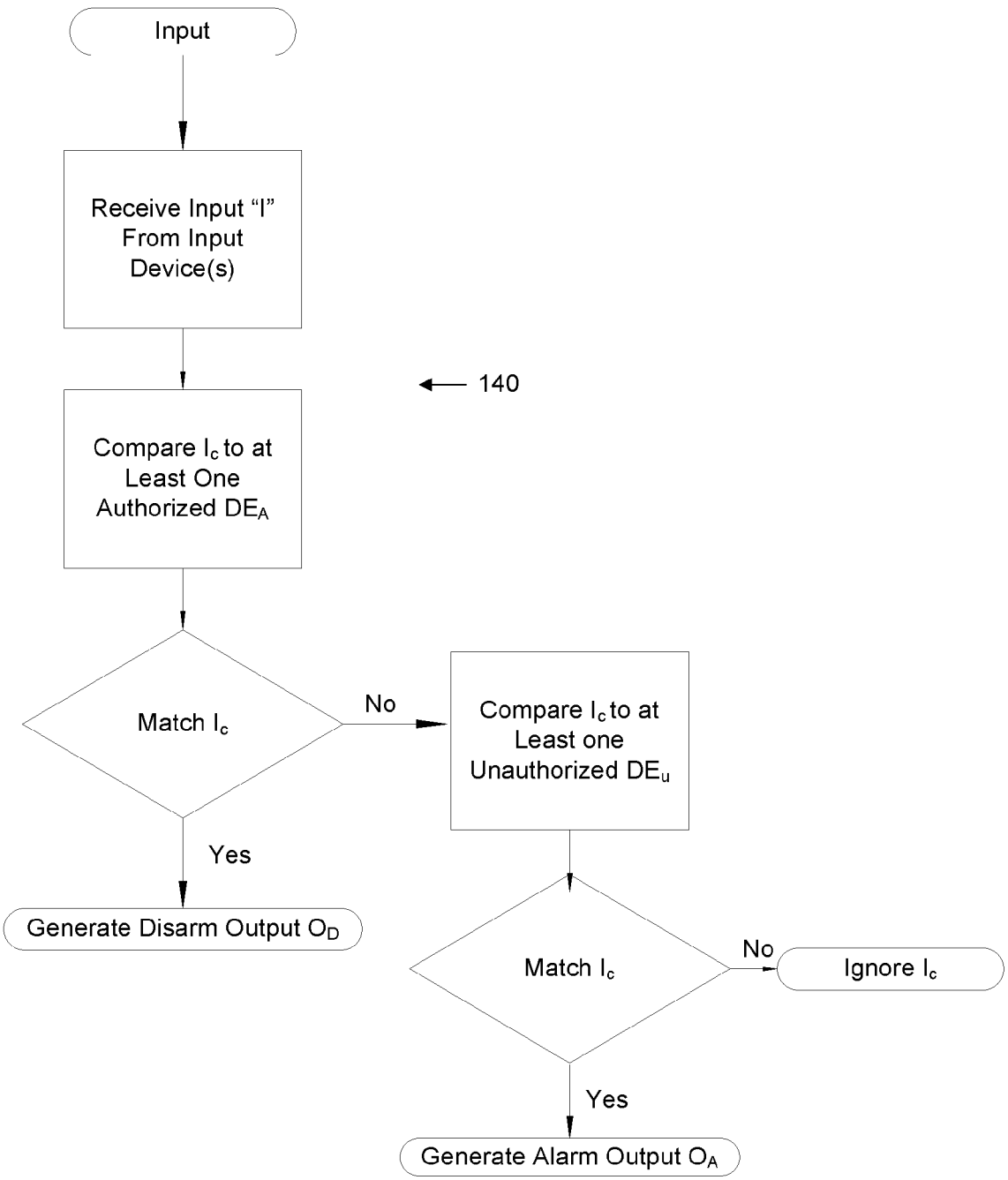
FIG. 38 is another logic diagram of the control assembly, shown alternatively generating disarm and alarm outputs.
Figure 39:
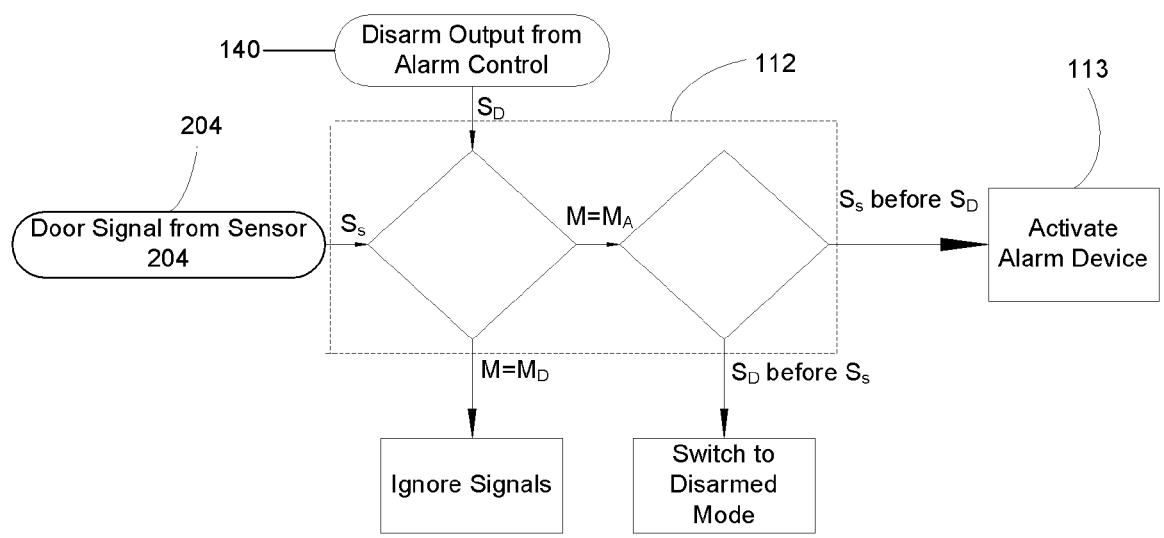
FIG. 39 is a logic diagram of the alarm control.

Referring to FIGS. 36-39, the access control 140 in one construction is configured to generate and transmit a disarm output $O_D$ to the alarm control 112 and/or the alarm device(s) 113 when the access control 140 determines that the input $I_C$ corresponds with the at least one stored data element $DE_N$, as indicated in FIGS. 36-38. More specifically, the alarm control 112 is configured to selectively operate in an armed mode $M_A$ and alternatively in a disarmed mode $M_D$, and to switch from the armed mode $M_A$ to the disarmed mode $M_A$ when the alarm control 112 receives the disarm output $O_D$ from the access control 140, as indicated in FIG. 39. As such, an authorized user may enter an appropriate input $I_C$ into the access control 140 to "disarm" the security features of the building alarm system 200, and simultaneously unlock the lock 160. Furthermore, as indicated in FIG. 38, the access control 140 can also be configured to generate an alarm output $O_A$ either when the control 140 has received a single input $I_C$ that corresponds to a stored data element $DE_U$ designated or "classified" as being unauthorized, as described below, or when the control 140 has received a predetermined plurality of inputs $I_c$ (e.g., three inputs) and each fails to correspond to any one of the authorized data elements $DE_A$.

Referring particularly to FIG. 34, the alarm control 112 is also configured to activate the one or more alarm devices 113 when the door D moves with respect to the frame F while the alarm control 112 is in the armed mode $M_A$, and to take no "alarm action" when the door D displaces while the alarm control 112 is in the disarmed mode $M_D$. Specifically, the alarm or security features of the building alarm system 200 preferably may include at least one sensor 204 configured to sense displacement of the door relative to the frame F. The door sensor 204 is either hard-wired to the alarm control 112 or is connected with a wireless transmitter 224 configured to generate and transmit a sensor signal $S_S$ to the alarm control 112, as depicted in FIG. 34. As such, when the alarm control 112 receives the door sensor signal $S_S$ indicating that the door D has been opened without authorized operation of the lock system 100, the alarm control 112 takes appropriate alarm action(s), as described below.

Figure 43:
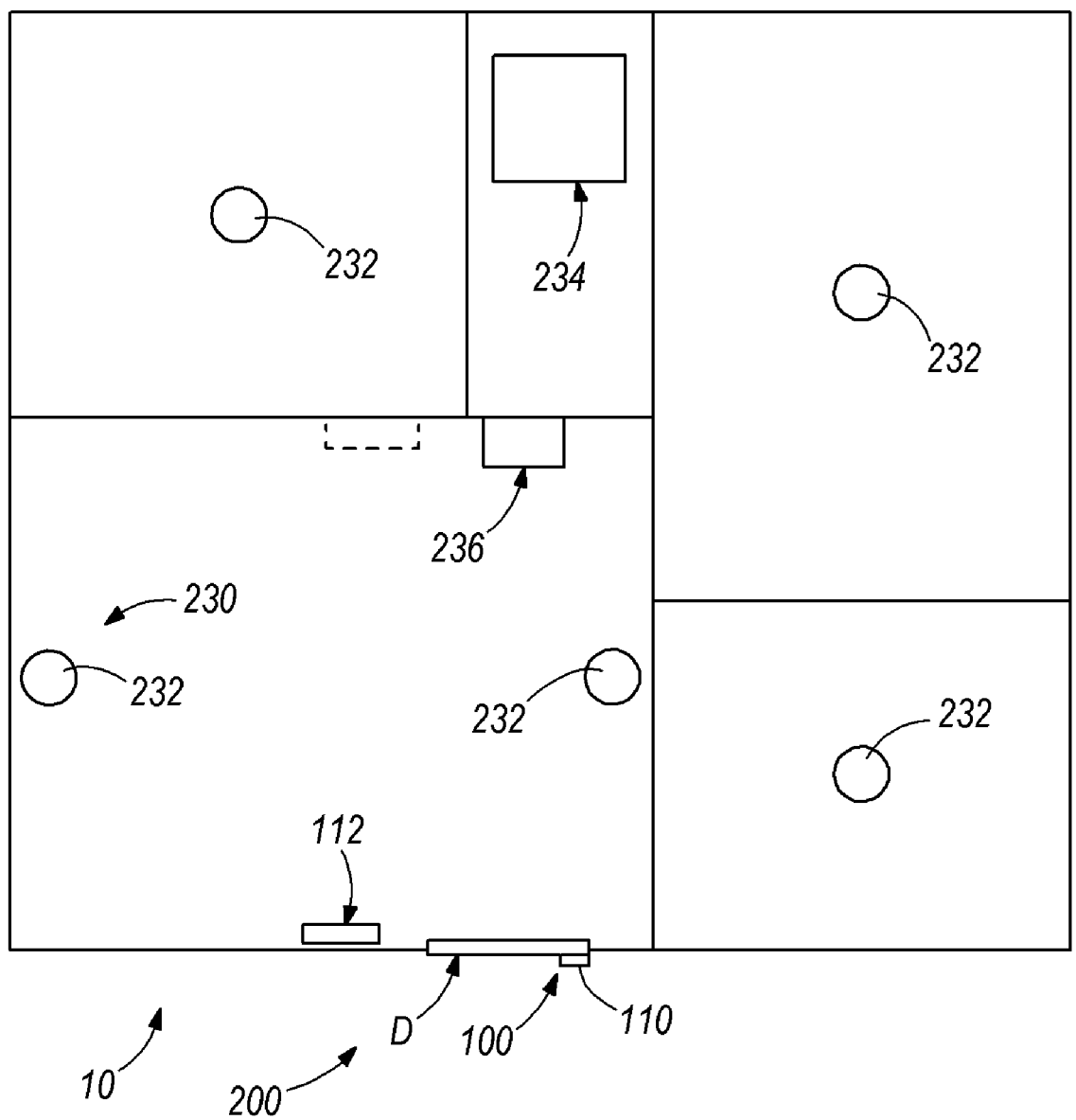
FIG. 43 is a schematic view of a combined alarm system and home automation system.

In one construction, the access control 140 communicates directly with the alarm control 112, and the alarm control 112 in turn directly operates the alarm device(s) 113. Specifically, the alarm control 112 is configured to activate each of the one or more alarm devices 113 such that each device 113 provides an audible and/or visible warning to discourage an intruder and provide a warning to building occupants or neighbors, and/or summon security personnel, etc., as discussed in greater detail below. However, the security features of the building alarm system 200 may be formed or constructed without an alarm control and arranged/configured such that the access control 140 directly communicates with and operates the one or more alarm device(s) 113 and/or other appropriate devices (e.g., a communication device contacting security personnel, etc.). As discussed above, the alarm control 112 may be part of a home automation system, such as the system 10 described previously, which may be configured to operate one or more auxiliary systems, such as for example, a home lighting system 230 including one or more lights 232, a HVAC unit 234, a music or announcement system 236, etc., when the disarm output $O_D$ is transmitted by the control 140, as shown in FIG. 43.

Referring to FIGS. 34 and 42, the control assembly 110 and lock system 100 in certain constructions further include a wireless transmitter 224 configured to receive the output $O_N$ from the access control 140 and to transmit to the alarm control 112 and/or an alarm device 113 an electromagnetic signal $S_N$ corresponding to the output signal $O_N$. By including the wireless transmitter 224, the installation of the lock system 100 is facilitated and the control 140 is more readily capable of communicating with a plurality of devices, including the alarm control 112, one or more alarm devices 113, and other components of the system 10. The wireless transmitter 224 is preferably a wireless transceiver that enables two-way communication between the access control 140, the alarm control 112, and/or other devices, such as was described with regard to FIGS. 1-5. Alternatively, the access control 140 may be "hard wired", i.e. electrically connected by one or more wires, to the alarm control 112, the one or more alarm devices 113, etc.

Figure 35:
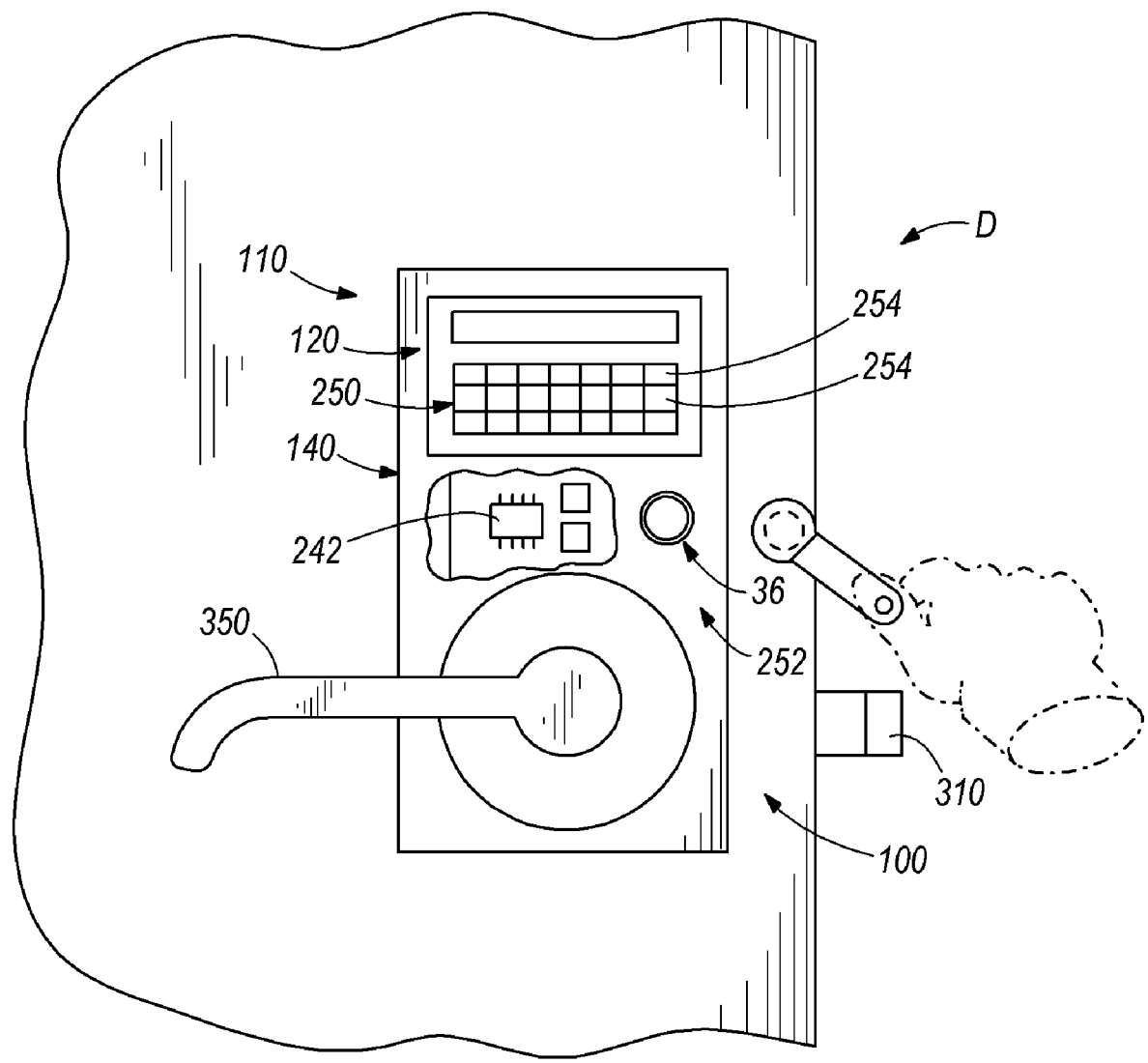
FIG. 35 is front elevational view of the lock system.

Referring to FIG. 35, the access control 140 in one construction includes a memory 240 configured to receive and store at least one value or data element $DE_A$ corresponding to an authorized user and/or an authorized input, and in another construction, the memory 240 has a plurality of "authorized" stored data elements $DE_A$. Also, the access control 140 is configured to generate the disarm output $O_D$ when the control 140 determines that the input $I_C$ corresponds to any of the plurality of stored data elements $DE_A$. As such, multiple users may be provided with access through the door D by entering different codes into, or presenting different credentials to, the input device 120, each code or credential providing a different input $I_C$, as discussed further below.

As shown in FIG. 35, the access control 140 preferably includes a microprocessor 242 coupled with the memory 240 and with the input device 120. The memory 240 preferably includes one or more memory chips 244. The microprocessor 242 is configured (e.g. programmed, assembled, wired, etc.) to receive the control input $I_c$, to compare the input $I_C$ with the stored data element(s) $DE_N$ located in the memory 240, and to generate the disarm output $O_D$, the alarm output $O_A$, or other output(s) as appropriate for the results of such comparison. In one construction, the microprocessor 242 of the access control 140 is also configured to receive and to store or "write" one or more values as authorized data elements $DE_A$ within the memory 240, the values being received from the input device 120 or a programming device, as discussed below. Thereafter, when the microprocessor 242 subsequently receives an input $I_C$ corresponding to at least one of the authorized stored data elements $DE_A$, the access control 140 preferably both operates the lock 160 and transmits the disarm output $O_D$ to the alarm control 112 or alarm device 113, as indicated in FIG. 37. Further, the microprocessor 242 is also preferably configured to receive and store one or more values as "unauthorized" values or data elements $DE_U$ and to generate and transmit the alarm output $O_A$ when subsequently receiving an input $I_C$ corresponding to an unauthorized data element $DE_L$, as indicated in FIG. 44.

More specifically, the access control 140 is preferably configured to designate or "classify" each stored data element $DE_N$ as either an authorized data element $DE_A$ or an unauthorized data element $DE_L$, and thereafter generate the disarm or alarm outputs $O_D$, $O_A$ when receiving an input $I_C$ corresponding to the particular data value $DE_N$. Further, the access control 140, preferably by means of the microprocessor 242, is also configured to re-designate or "reclassify" a previously authorized data element $DE_A$ as an unauthorized data element $DE_L$, and vice-versa. As such, the stored data element $DE_A$ of a previously permitted user's code or credential may be reclassified as unauthorized when circumstances have changed (e.g. when someone is no longer a member of a household).

Further, a person may be provided with a code or credential corresponding to an authorized data element $DE_A$ so as to allow access limited to a specific duration (e.g., one week), but then the control 140 reclassifies the particular stored data element $DE_U$ as being unauthorized once the period has expired. In either case, whenever a user whose code, credential, etc. has been reclassified as unauthorized attempts access through the door D such that the control 140 receives an input $I_C$ now corresponding to an unauthorized data element $DE_L$, the control 140 generates the alarm output $O_A$ so that appropriate warning and/or actions are taken by the alarm control 112 and/or an alarm device(s) 113, as discussed below.

Referring now to FIGS. 34, 35, and 42, the input device 120 may be any appropriate type of input device used with electronic or electronically controlled locks, such as a keypad 250, a reader 252, a touch screen, a scanner, etc. More specifically, when provided by a keypad 250, the input device 120 includes at least one and preferably a plurality of manually manipulable input members 254 (e.g., buttons), each electrically connected to the access control 140, as best shown in FIG. 35. As such, an input signal is generated and transmitted to the access control 140 when a user manipulates each one of the input members 254, to thereby provide the input $I_C$. When the input device 120 is constructed as a reader 252 as shown in FIGS. 35 and 42, the reader 252 is configured to extract input $I_C$ from a credential (e.g., a card, an iButton, etc.) and to transmit the input $I_C$ to the access control 140. Further, in a construction in which a touch screen is used as the input device 120, the touch screen includes a panel and one or more pressure sensors configured to generate an input signal when pressed by a user, the sensor(s) being electrically connected with the access control. In another construction in which the input device 120 is a scanner, the scanner is configured to scan a physical feature of a user, such as the user's fingerprint, iris, etc., and to generate and transmit to the access control 140 an input signal $I_C$ whenever a user presents the physical feature to the scanner. Additionally, it must be noted that the input device 120 may be constructed in any appropriate manner that enables a user to enter an input $I_C$ to the access control 140, and the scope of the present invention is in no manner limited to any particular type of input device 120.

In certain constructions, the input device 120 is capable of being used to "program" or enter authorized and unauthorized data elements $DE_A$, $DE_U$ into the memory 240 of the access control 140. In other words, the input device 120 is configured to operate in a programming mode in which the input device 120 receives (e.g., from a credential) and/or generates (e.g., by means of a key pad 250) one or more inputs $I_C$ each corresponding to an authorized user or an unauthorized user, and the access control 140 is configured to receive and store the input $I_C$ as an authorized data element $DE_A$ or unauthorized data element $DE_L$, respectively. Alternatively or additionally, the lock system 100 may further include a data input device configured to receive and/or generate one or more inputs $I_C$ each corresponding to either an authorized or unauthorized user, and the access control 140 receives and stores the input $I_C$ as a data element $DE_A$ or $DE_U$ as appropriate.

As best shown in FIG. 34, the alarm control module 260 preferably includes a microprocessor 262, a memory 264, an input device 266, a display screen 268, and appropriate supporting components (e.g., wiring, etc.).

Figure 41:
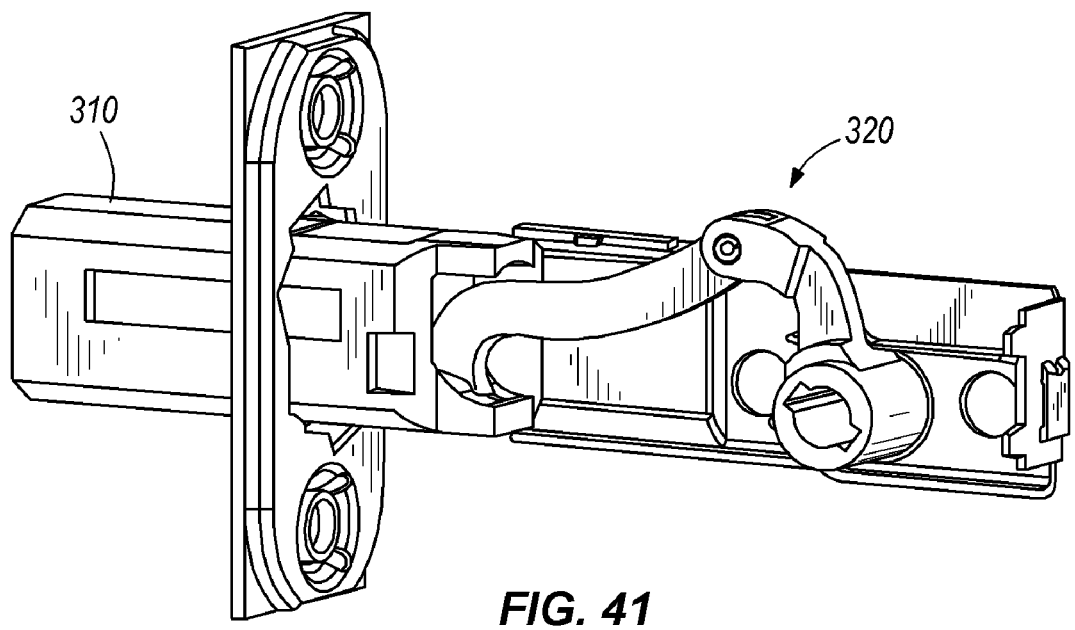
FIG. 41 is perspective view of a retractor mechanism.

Referring to FIGS. 40-42, the lock 160 of the lock system 120 may be constructed as any appropriate type of lock, such as a mechanical lock, an electromechanical lock 300 (FIGS. 34, 35, and 40), an electromagnetic lock 272 (FIG. 42), etc. In certain constructions, the lock 160 is electromechanical or electromagnetic and the access control 140 functions to operate the lock 160, as discussed above and described in further detail below. However, the lock 160 may be a purely mechanical lock, such as a key-operated cylinder lock, in which case the access control 140 primarily functions to operate the alarm control 112 and/or alarm device(s) 113.

As best shown in FIGS. 40 and 41, when the lock 160 is an electromechanical lock 300, the lock 160 includes a latch 310, a retractor 320 (FIG. 41) for displacing the latch 310, a manually rotatable spindle 330 for operating the retractor 320, either a clutch mechanism 340 or a retainer mechanism, and the actuator 180, as discussed above, which operates the clutch or retainer mechanisms. The latch 310 is disposed within a bore formed in the door D and is movable between an extended or "locked" position, in which the latch engages a strike in the door frame F, and a retracted or "unlocked" position in which the latch 310 is completely disengaged from the strike. The retractor 320 is operatively coupled with and configured to displace the latch 310 between the locked and unlocked positions, and may be constructed in any known or other appropriate manner (e.g. a linkage forming a "crank slider" mechanism with the latch 310). Further, the spindle 330 is manually rotatable, preferably by means of a lever 350 or knob, is coupled with and extends outwardly from the door D, and is operatively coupleable with the retractor 320. As such, rotation of the spindle 330 operates the retractor 320 (e.g., pivots the bar linkage members, etc.) so as to displace the latch 310.

When the electromechanical lock 300 includes a clutch mechanism 340, as shown in FIG. 40, the clutch mechanism 340 is configured to releasably couple the spindle 330 with the retractor 310. For example, clutch mechanism 340 may include a first clutch member 342 connected with the spindle 330 and a second clutch member 344 connected with the retractor 320 (e.g. through an inner spindle), one of the clutch members 342, 344 being slidably displaceable by means of the actuator 180 to releasably engage with the other member 344, 342. With such a clutch mechanism 340, the actuator 180 may include a motor 360 and a cam 370 connected with the motor 360 and configured to displace one of the clutch members 342, 344. Alternatively, when the electromechanical lock 300 includes a retainer mechanism, the retainer mechanism is configured to releasably engage with either the spindle 330 or the retractor 302 so as to prevent displacement of the latch 310, the actuator 180 being appropriately constructed to displace the mechanism. Furthermore, with an electromechanical lock 300, the access control 140 is configured to transmit a control signal $S_C$ to the actuator 180 when the input $I_C$ corresponds with an authorized stored value/data element $DE_A$. Thereafter, the actuator 180 operates the clutch mechanism 340 or the retainer mechanism as appropriate.

Referring to FIG. 42, when the lock 160 is an electromagnetic lock 400, the lock 400 includes an electromagnet 410 configured to releasably secure the door D within the frame F, preferably by electromagnetically coupling with a metallic member (e.g., a metal plate, a portion of the door or frame, etc.) and includes a power supply 420. Using an electromagnetic lock 400, the access control 140 is configured to operate the electromagnet 410, such that the door D is displaceable with respect to the frame F, when an input $I_C$ corresponds with one of the authorized data elements $DE_A$.

Referring now to FIGS. 34 and 43, the alarm device 113 may be, or may include, a siren 500, a switch 510 controlling one or more lights 520, a communication device 530, or any other appropriate alarm device. Specifically, the siren 500 is configured to generate an audible alarm so as to warn inhabitants or neighbors of a protected premises and encourage intruders to vacate the premises. With a switch, the switch 510 is coupleable with one or more light devices 530 so as to activate the light(s) 520 when the alarm control 112 or device 113 receives the alarm output $O_A$, thereby illuminating the protected premises. Further, the communication device 530 is configured to contact security personnel to inform of an intrusion and summon the personnel to the premises. The communication device 530 may include an auto dialer coupled with a telephone or computer network, a switch wired into a monitored control panel, etc.

Furthermore, as discussed above, the access control 140 is preferably configured to generate a plurality of different disarm outputs $O_{Dn}$ each corresponding to a separate one of the authorized values or data elements $DE_{An}$. Each disarm output $O_{Dn}$ is received by the alarm control 112, the alarm devices 113, and/or a separate control 114 of the automation system 10. Thereby, in addition to switching the building alarm system 200 to the disarmed mode, the appropriate control 112 or 114 operates one or more auxiliary devices or systems 230, 234, 236, etc. As such, the access control 140 is capable of directing the alarm control 112 or automation system 204 to perform different actions tailored to each authorized user.

For example, when a first user enters an input $I_{C1}$ corresponding with a first authorized code $DE_{A1}$, the access control 140 sends a first disarm output $O_{A1}$ to alarm control 112 and/or the automation system control 114. The alarm control 112 thereby adjusts to the disarmed mode $M_D$, if in the armed mode $M_A$, and the control 112 or the automation control 114 operates the lighting system 230 to turn on certain lights 232 and/or adjusts the intensity level of the lights 232, operates the HVAC unit 234 to achieve a particular first temperature, and/or operates the music/announcement system 236 to play certain music or an announcement of or directed to the particular first user. Alternatively, when a second authorized user enters a second input $I_{C2}$ corresponding with a second authorized data element $DE_{A2}$, the access control sends a second, different disarm output $O_{D2}$.

In addition to switching to the disarmed mode $M_D$, the alarm control 112 or the automation system control 114 operates the lighting system 230 to turn on a different set of lights 232 and/or adjusts the lights 232 to a different intensity level, operates the HVAC unit 234 to achieve a second temperature, and/or operates the music/announcement system 236 to play different music or an announcement of or directed to the particular second user. The alarm control 112 or automation control 114 may be configured to operate any number of different systems (e.g., coffee makers, ovens, automated windows) in any possible combinations for any number of users as desired.

Thus, the components of the building alarm system 200, including the alarm control 112, the automation control 114, and the access control 140, may be part of a home automation system such as the system 10 described above with reference to FIGS. 1-5. The alarm control 112, the automation system control 114, and the access control 140 can communicate with and be controlled by remote devices such as a computer or cell phone, as described above. For example, each of the controls 112, 114, 140 may communicate via a wireless connection to the gateway device 50 as part of the RF mesh network 20. In addition, the controls 112, 114, 140 may communicate via a wired or wireless connection to the gateway device 50 or to the router 46. The gateway device 50 and/or the router 46 can then connect to and communicate with a larger computer network such as the Internet. The user can connect to the larger network, for example using a computer or a cell phone, and remotely communicate with the controls 112, 114, 140 to obtain status information and to issue commands, as described previously.

The invention provides, among other things, a new and useful system for providing and monitoring access control in addition to controlling household devices. The constructions of the system described herein and illustrated in the figures are presented by way of example only and are not intended as a limitation upon the concepts and principles of the invention.

What is claimed is:

1. A method of remotely operating a door lock, comprising:
   moving a mesh network gateway to a first position adjacent the door lock;
   powering the mesh network gateway device using a battery to integrate the door lock into a mesh network;
   moving the mesh network gateway to a second position different from the first position to provide AC power to operate the mesh network gateway;
   transmitting a first signal from a remote device to a router via a network;
   transmitting the signal from the router to the mesh network gateway;
   translating the signal from a network protocol to a mesh network protocol to produce a second signal;
   transmitting the second signal from the mesh network gateway to the door lock using radio frequency signaling over the mesh network;
   receiving the second signal at the door lock; and
   performing an operation at the door lock in response to the second signal being received by the door lock.

2. The method of claim 1, wherein the operation includes changing the door lock between a locked and an unlocked state.

3. The method of claim 1, wherein the operation includes adding or deleting a user code to or from a list of user codes in the door lock.

4. The method of claim 1, wherein the operation includes transmitting a third signal from the door lock to the mesh network gateway, the third signal indicating a status of the door lock.

5. The method of claim 4, wherein the status includes at least one of: whether the door lock is locked or unlocked, whether the door lock has been accessed, an identity of a user who has accessed or attempted to access the door lock, and whether a distress code has been entered.

6. The method of claim 1, wherein transmitting a signal from a mobile device to a mesh network gateway is through the Internet.

7. The method of claim 6, wherein transmitting a signal from a mobile device to a mesh network gateway is performed using short message service signaling.

8. A system for remotely controlling access to an access point, the system comprising:
   a lock comprising a locking mechanism, a radio-frequency mesh network transceiver operatively coupled to the lock, a power source, and at least one of a keyed entry system and a keyless entry system operatively coupled to the locking mechanism, the lock positioned adjacent the access point and the locking mechanism movable between a locked position and an unlocked position;
   a radio-frequency mesh network gateway device comprising a housing, a radio-frequency transceiver, an Internet Protocol transceiver operatively coupled to the radio-frequency transceiver, a first power supply, a second power supply, and a logic and memory unit, the Internet Protocol transceiver operatively connected to a computer network, wherein the radio-frequency mesh network gateway device is configured to communicate with the lock using radio frequency communications, the first power supply operable to provide power to the mesh network gateway device with no external connections and to provide power to integrate the lock into a mesh network when the mesh network gateway device is placed adjacent the door lock, and the second power supply operable to provide AC power from a source external to the network gateway device;
   a server operatively connected to the computer network; and
   a remote communication device in operative communication with the server, wherein the remote communication device is configured to remotely monitor and operate the lock.

9. The system of claim 8, wherein the lock is a door lock and the access point is an entry to a structure.

10. The system of claim 8, wherein the computer network is the Internet.

11. The system of claim 10, wherein the remote communication device is a computer that is networked with the Internet.

12. The system of claim 8, wherein the remote communication device is a mobile telephone.

13. The system of claim 8, wherein the first power supply includes a battery.

14. The system of claim 8, wherein the lock comprises a keyless entry system having a keypad for entering an access code and a memory configured to store at least one access code.

15. The system of claim 8, wherein the lock comprises a powered lock mechanism.

16. The system of claim 15, wherein the lock is powered by a battery or by A/C power.

17. The system of claim 8 wherein the device is any RF networked device.

18. The system of claim 8, wherein the second power supply includes an AC power supply and the first power supply includes a DC power supply.

19. A system for remotely controlling access to a plurality of access points, the system comprising:
    a plurality of locks, each comprising a locking mechanism, a radio-frequency mesh network transceiver operatively coupled to the lock, a power source, and at least one of a keyed entry system and a keyless entry system operatively coupled to the locking mechanism, each lock positioned adjacent to one of the plurality of access points and the locking mechanism movable between a locked position and an unlocked position;
    a radio-frequency mesh network gateway device comprising a housing, a radio-frequency transceiver, an Internet Protocol transceiver operatively coupled to the radio-frequency transceiver, a power supply, and a logic and memory unit, the Internet Protocol transceiver operatively connected to a computer network, wherein the radio-frequency mesh network gateway device is configured to communicate with each of the plurality of locks using radio frequency communications, the mesh network gateway device being movable to a plurality of positions, each of which being adjacent one of the plurality of access points to allow the mesh network gateway device to integrate each of the locks into a mesh network, the mesh network gateway device also positionable at a location away from each of the plurality of access points;
    a server operatively connected to the computer network; and
    a mobile telephone in operative communication with the server, wherein the remote communication device is configured to remotely monitor and operate the lock.

20. The system of claim 19, wherein the radio-frequency mesh network gateway device includes an AC power supply and a DC power supply.

21. The system of claim 19, further comprising a plurality of non-lock controllers each operable to control a non-lock device and each including a radio-frequency mesh network transceiver operatively coupled to a respective controller.

* * * * *